(12) United States Patent
Gordon

(10) Patent No.: US 11,185,057 B2
(45) Date of Patent: Nov. 30, 2021

(54) AUTOMATED AQUAPONICS APPARATUS

(71) Applicant: Matthew Charles Gordon, Stockton, MD (US)

(72) Inventor: Matthew Charles Gordon, Stockton, MD (US)

(*) Notice: Subject to any disclaimer, the term of this patent is extended or adjusted under 35 U.S.C. 154(b) by 373 days.

(21) Appl. No.: 15/984,220

(22) Filed: May 18, 2018

(65) Prior Publication Data
US 2018/0332830 A1 Nov. 22, 2018

Related U.S. Application Data

(60) Provisional application No. 62/507,916, filed on May 18, 2017.

(51) Int. Cl.
| | | |
|---|---|---|
| *A01K 63/00* | (2017.01) | |
| *A01K 61/10* | (2017.01) | |
| *B01D 61/02* | (2006.01) | |
| *C02F 3/00* | (2006.01) | |
| *C02F 1/44* | (2006.01) | |
| *B01D 53/26* | (2006.01) | |
| *A01K 63/04* | (2006.01) | |
| *A01G 31/02* | (2006.01) | |
| *C02F 1/00* | (2006.01) | |

(Continued)

(52) U.S. Cl.
CPC .............. *A01K 61/10* (2017.01); *A01G 31/02* (2013.01); *A01K 63/006* (2013.01); *A01K 63/04* (2013.01); *A01K 63/047* (2013.01); *B01D 53/26* (2013.01); *B01D 61/025* (2013.01); *C02F 1/008* (2013.01); *C02F 1/441* (2013.01); *C02F 3/00* (2013.01); *C02F 3/28* (2013.01); *A01G 2031/006* (2013.01); *C02F 2103/20* (2013.01); *C02F 2103/26* (2013.01); *C02F 2209/06* (2013.01); *C02F 2303/10* (2013.01)

(58) Field of Classification Search
CPC .. A01G 31/00; A01G 31/02; A01G 2031/006; A01K 63/00; A01K 63/003; A01K 63/006; A01K 63/04; A01K 63/045; A01K 63/047; A01K 63/06
USPC .................. 119/226, 227, 245–247, 259, 260
See application file for complete search history.

(56) References Cited

U.S. PATENT DOCUMENTS

| | | | | |
|---|---|---|---|---|
| 5,081,954 A | * | 1/1992 | Monus .................... | A01K 63/04 119/260 |
| 6,032,613 A | * | 3/2000 | Rahman ................. | A01K 63/04 119/231 |

(Continued)

*Primary Examiner* — Peter M Poon
*Assistant Examiner* — Danielle A Clerkley

(57) ABSTRACT

Disclosed is an automated aquaponics apparatus. The aquaponics apparatus may include at least one fish holding tank configured to contain water. Further, the aquaponics apparatus may include at least one hydroponic unit. Further, the aquaponics apparatus may include a bio-digester. Further, the aquaponics apparatus may include an atmospheric water generator and a desalination reverse osmosis system. Further, the aquaponics apparatus may include an energy production system configured to generate energy. Further, the aquaponics apparatus may include at least one sensor configured to sense at least one variable. Further, the aquaponics apparatus may include a control unit configured to control an operational state of one or more of the at least one fish holding tank, the at least one hydroponic unit, the bio-digester, the desalination reverse osmosis system and the energy production system.

16 Claims, 35 Drawing Sheets

(51) Int. Cl.
    *C02F 3/28*     (2006.01)
    *A01G 31/00*     (2018.01)
    *C02F 103/20*     (2006.01)
    *C02F 103/26*     (2006.01)

(56) References Cited

U.S. PATENT DOCUMENTS

| | | | |
|---|---|---|---|
| 8,966,816 B2 * | 3/2015 | Toone | A01G 31/02 |
| | | | 119/246 |
| 10,182,536 B1 * | 1/2019 | Andracki | A01G 22/00 |
| 10,206,377 B2 * | 2/2019 | Barber | A01K 63/04 |
| 10,687,485 B2 * | 6/2020 | Villamar | A01K 61/10 |
| 2009/0301399 A1 * | 12/2009 | Brown | A01K 63/04 |
| | | | 119/226 |
| 2010/0031893 A1 * | 2/2010 | Bodlovich | A01G 24/00 |
| | | | 119/227 |
| 2011/0041395 A1 * | 2/2011 | Newbold | A01G 31/02 |
| | | | 47/1.4 |
| 2011/0131880 A1 * | 6/2011 | Kloas | A01K 63/04 |
| | | | 47/62 R |
| 2013/0255146 A1 * | 10/2013 | Lehman | A01G 31/06 |
| | | | 47/17 |
| 2015/0196002 A1 * | 7/2015 | Friesth | C12M 41/48 |
| | | | 47/62 R |
| 2017/0325427 A1 * | 11/2017 | Straight | A01G 31/06 |

\* cited by examiner

AUTOMATED AQUAPONICS APPARATUS

The current application claims a priority to the U.S. Provisional Patent application Ser. No. 62/507,916 filed on May 18, 2017.

FIELD OF THE INVENTION

The present invention relates to an aquaponics system for producing food products. In particular, the present invention relates to an aquaponics system integrated with a bio-digester, an atmospheric water generator, a desalination reverse osmosis system and an energy production system.

BACKGROUND OF THE INVENTION

The available arable land worldwide is decreasing every year. According to some researchers, Earth has lost a third of arable land in past 40 years. This damage is largely caused by erosion, soil degradation and pollution. This poses a significant threat to life of humans and livestock, as the global demand for good is surging.

Further, fresh food is not available in many parts of the world. Moreover, there is a demand for urban farms that can provide healthy, organic, food to people in urban areas.

Accordingly, there is a need for an improved apparatus for producing organic food to fulfil the demand of humans and livestock that may also overcome one or more of the abovementioned problems and/or limitations.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to some aspects, an automated aquaponics apparatus is disclosed. The automated aquaponics apparatus may include at least one fish holding tank configured to contain water. Further, the automated aquaponics apparatus may include at least one hydroponic unit. Further, the at least one fish holding tank may be functionally connected with the at least one hydroponic unit such that water from the at least one fish holding tank can be supplied to the at least one hydroponic unit and water from the at least one hydroponic unit can be supplied to the at least one fish holding tank. Further, the automated aquaponics apparatus may include a bio-digester functionally connected with the at least one fish holding tank. Further, the automated aquaponics apparatus may include an atmospheric water generator functionally connected with one or more of the at least one fish holding tank and the at least one hydroponic unit. Further, the automated aquaponics apparatus may include desalination reverse osmosis system functionally connected with one or more of the at least one fish holding tank and the at least one hydroponic unit. Further, the automated aquaponics apparatus may include an energy production system configured to generate energy for powering the automated aquaponics apparatus. Further, the automated aquaponics apparatus may include at least one sensor configured to sense at least one variable associated with the automated aquaponics apparatus. Further, the automated aquaponics apparatus may include a control unit configured to control an operational state of one or more of the at least one fish holding tank, the at least one hydroponic unit, the bio-digester, the desalination reverse osmosis system and the energy production system.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 7 shows an exemplary facility size worksheet of the software application, in accordance with an embodiment.

FIG. 9 shows an exemplary farm sales price worksheet of the software application, in accordance with an embodiment.

FIG. 21 shows an exemplary operation cost (computed) worksheet of the software application, in accordance with an embodiment.

DETAILED DESCRIPTION OF THE INVENTION

Figure 1:
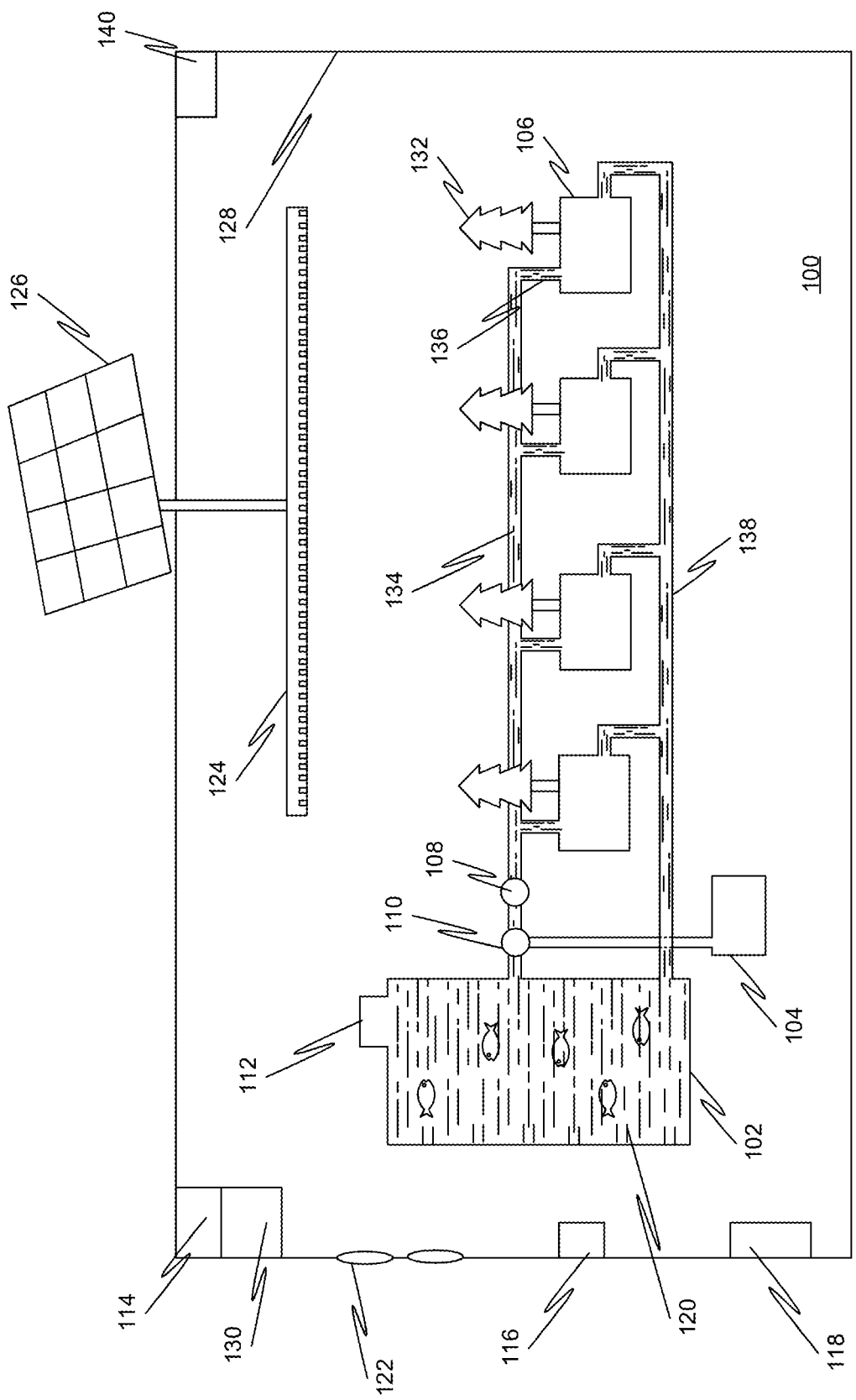
FIG. 1 illustrates an exemplary automated aquaponics system in accordance with an embodiment.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of aquaponics systems, embodiments of the present disclosure are not limited to use only in this context.

Overview

According to some embodiments, an automated aquaponics system is disclosed. The automated aquaponics system is integrated with a syngas (or biogas) producing bio-digester and photovoltaic energy production system which produces organic produce for human and livestock production utilizing 90% less water consumption than conventional farming.

The aquaponics system includes fish holding tanks to raise food stock and create waste which is sent through a bio-filter and flows over produce and crops. The aquaponics system utilizes one or more of Dutch buckets, NFT, and fodder systems along with flow beds through a raft system. Any waste that is collected from processing in placed into a biogas digester that creates syngas that is recirculated into a Controlled Agriculture Environment (CEA) and repurposed for energy through electric generation and gas for heating. The byproduct of this process is water which is recirculated back into the fish holding tanks. Further, a solar power generating system is integrated with the aquaponics system. Moreover, a hydroelectric charger may be placed in the path of tubing flows of water to generate electricity. The atmospheric water generator creates water and maintains levels necessary for operations. The desalination and reverse osmosis system creates potable water for human and livestock support.

According to some embodiments, the disclosed aquaponics system is capable of being placed inside a shipping container, up to 40 feet in length, and may be placed in parallel or vertically installed use for increased food production. The exterior of the containers may be of any shape or texture or design to mimic walls, wood walls, tile walls, and brick walls. A smaller version may fit in a garden house for home consumers. The larger systems may be integrated to utilize vertical grow space and repurposing of industrial space throughout the United States. Further, the large systems may be used at hotels, restaurants, schools, nursing home, hospital.

Further, there are no water, soil or weather limitations due to a contained process. Energy is created through waste. Further, larger systems utilize hydro-electric pumps to offset additional energy demand. To minimize the reliance on LED grow systems, solar tubular skylights may be integrated into system as needed. The containers and/or building may have interior structural rooms made of structurally insulated panels that are 10-12 inches thick to create an R-Value close to 50 for no thermal exchange. The interior walls of each space may be nonporous and wipe-able for health and safety standards. Further, areas of limited water supply may be able to use livestock manure, human waste, food waste or other biomass material to generate electricity and heat with the byproduct of water that may be recirculated into the system to reduce water demands. The atmospheric water generator may supply fresh drinking water on a daily basis. The desalination and reverse osmosis system allows for placement. The water produced through the bio-digester is most suitable for toilet flushing or irrigation of crops. Further, aquaponics systems may be sized from a small greenhouse to service an entire community.

The disclosed Controlled Environmental Agricultural Pods (CEAPods) or Controlled Environmental Agricultural Farm (CEAFarm) may be uniquely designed to produce year round food stock with no limits on variety.

The disclosed system does not require soil, may be located in areas with no arable land, conserves energy, is energy efficient, is non-polluting, and it is a sustainable food production practice. It produces organic produce for human and livestock production utilizing 90% less water consumption than conventional farming.

Referring now to figures, FIG. 1 illustrates an exemplary automated aquaponics system 100 in accordance with an embodiment. The aquaponics system 100 may include a fish tank 102 holding fish. In an embodiment, the automated aquaponics system 100 may include multiple fish tanks. Dirty water from the fish tank 102 may be filtered using a filter 110 and solids may be sent to a digester 104. The digester 104 may include a grinder and a pump. The digester 104 may take waste products to create bio-mass for generating syngas and/or biogas. For example, Puxin PXabs3.4M3® biogas system provided by Shenzen PUXIN International® may be used as the digester 104. Any waste product generated within the aquaponics system 100 may be sent to the digester 104, where, the waste product may be ground, and then processed to produce syngas and/or biogas.

The water may be sent to one or more of Dutch buckets 106, a float raft, fodder, and crops. As shown, the water may be sent to the Dutch buckets 106, where the water may be cleaned by fruits, vegetable, plants 132 and herbs in a grow medium in the one or more Dutch buckets 106. The clean water may be then recirculated to the fish tank 102. No soil may be used in the process.

A flow bed may be used to propagate seeds and transfer to float rafts or a Nutrient Film Technique (NFT) channel system. For example, seeds provided by Johnny Seed (Non-GMO)® may be used. A pump 108 may recirculate water after the water may have been through flow beds. In NFT systems, nutrient-rich water may be pumped down small enclosed gutters in a very thin film. The one or more plants 132 may sit in small plastic cups allowing roots of the plants 132 to access the water and absorb the nutrients.

The fodder may be used to grow barley for livestock consumption along with microgreens and herbs. Herbs may be medicinal or for food consumption. The Dutch buckets 106 may hold vine stock that may produce tomatoes, grapes, fruiting trees including, but not limited to avocado or citrus.

Accordingly, the flow of water may begin from the fish tank 102. Dirty water from the fish tank 102 may be filtered using the filter 110 and solids may be sent to the digester 104. The water may be sent through the irrigation line 134 to one or more of Dutch buckets 106, a float raft, fodder, and crops. The water may be sent to the Dutch buckets 106 through a drip emitter 136, where the water may be cleaned by fruits, vegetables, plants 132 and herbs in a grow medium in the one or more Dutch buckets 106. The clean water may be then recirculated to the fish tank 102 via a return line 138. No soil may be used in the process.

Automated fish feeding unit 112, nutrient siphoning, and climate control may work in tandem to create Controlled Environment Agriculture Pods (CEAPods) and Controlled Environment Agriculture Farm (CEAFarm) model. CEA may optimize use of resources such as water, energy, space, capital, and labor. Further, CEA model may use a control unit 114 to control one or more variables. The one or more controllable variables may include temperature (air, nutrient solution, root-zone), humidity (% RH), carbon dioxide ($CO_2$), light (intensity, spectrum, interval), nutrient concentration (PPM, EC) and nutrient pH (acidity). The aquaponics system 100 may also include a monitored and an automated nutrient delivery system. Accordingly, the aquaponics system 100 may also include one or more sensors including a humidity sensor 116, temperature sensor 118, and pH sensor 120. The control unit 114 may communicate with various sensing and actuating units via wired or wireless communication channels, such as, but not limited to, Wi-Fi, Bluetooth, ZigBee. Accordingly, in an embodiment, the aquaponics system 100 may include a Wi-Fi module 130. Further, the aquaponics system 100 may include one or more automated vents 122 for CO2 control and air infiltration. Yet further, the aquaponics system 100 may include Integrated Pest Management (IPM) to combat loss and disease. A water curtain reciprocating system may be used for cooling various components of the aquaponics system 100. The aquaponics system 100 may also include a desalination system. A water filter may add air to the water.

Moreover, the aquaponics system 100 may include one or more LED Grow Lights 124. Hydroelectric turbines integrated into piping system for water flow may plug directly into the one or more LED Grow Lights 124 throughout each system. For example, the LED Grow Lights 124 from Growers Supply® may be used. Further, tubular skylights may also be used. The LED grow lights, tubular skylights and various other electronic components of the aquaponics system 100 may be powered using solar power. Accordingly, the aquaponics system 100 may include one or more solar panels 126. For example, SmartFlower Plus® solar panels produced by Smartpower Solar® may be used. Further, the aquaponics system 100 may include a camera 140 to monitor the growth of the one or more plants 132, crops, fruits, vegetables, and so on.

The aquaponics system 100 may be scalable from a small residential greenhouse to a large industrial site. The aquaponics system 100 may be placed inside a shipping container, up to 40 feet in length, and may be placed in parallel use for increased food production. Larger systems may be integrated to utilize vertical grow space and repurposing of industrial space throughout the United States. The CEAPods or CEAFarms may be uniquely designed to produce year-round food stock with no limits on variety. Further, Structurally Insulated Panels (SIP) 128 may be used on various surfaces of the aquaponics system 100.

Further, the aquaponics system 100 may vary and be modified to suit the location and availability of materials. Optimal growth may require proper aeration, adequate feed, and prescribed (fish) stocking densities. Therefore, it may be difficult to determine optimal parameters of a new or an upgraded aquaponics system 100. Before setting up a new aquaponics system 100 or upgrading existing an existing aquaponics system 100, the user may need to know rate of return on investment, vegetable crops to grow, vegetable technology to use, fish species to grow and harvesting my fish at what size.

Further, the aquaponics system 100 may be retrofitted in one or more sites that may no longer in use, such as old, and abandoned buildings.

Figure 2:
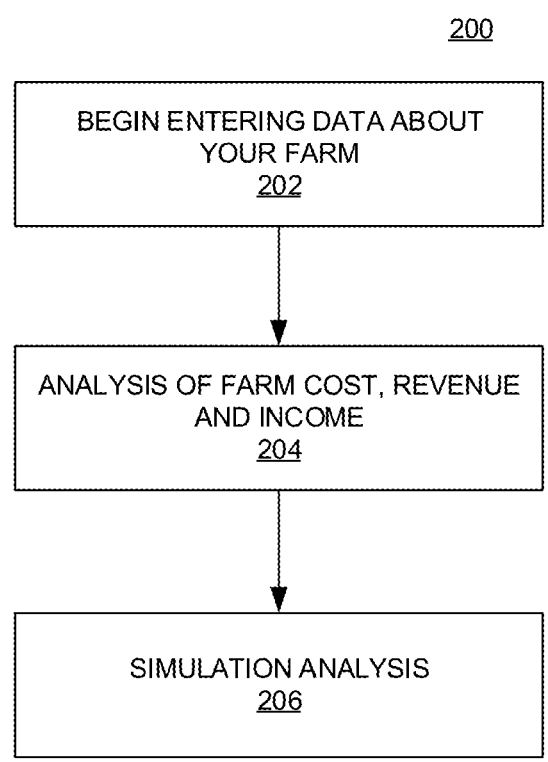
FIG. 2 illustrates a flowchart of a method to compute one or more parameters related to the aquaponics system, in accordance with an embodiment.

FIG. 2 illustrates a flowchart of a method 200 to compute one or more parameters related to an aquaponics system, such as the aquaponics system 100, in accordance with some embodiments. The one or more parameters may include upfront costs, operations costs, sales revenue, after-tax profit, and rate of return on a new or upgraded aquaponics system. The method 200 may apply one or more economic and business principles to analyze data provided by one or more users and display results in a format to help the one or more users to make informed farm decisions.

At 202, the method 200 may include receiving data from a user related to a farm. The user may provide the data through a user device such as a computer, a smartphone and so on. Further, the user device may include a software application to obtain the data from the user. The software application may be based on MS Excel platform, wherein the software application may include one or more appropriate forms and worksheets. For example, the software application may include multiple worksheets that may be used by the user to provide information related to the products produced by the user, the input costs, received prices, and the cost of constructing the farm. FIGS. 3-33 show exemplary worksheets (or user interfaces) of the software application as implemented in the MS Excel platform.

At 204, the method 200 may include analyzing the data about the farm. For example, the analyzing may provide values corresponding to the one or more parameters related to the aquaponics system.

At 206, the method 200 may include performing a simulation analysis based on the analyzing.

Figure 3:
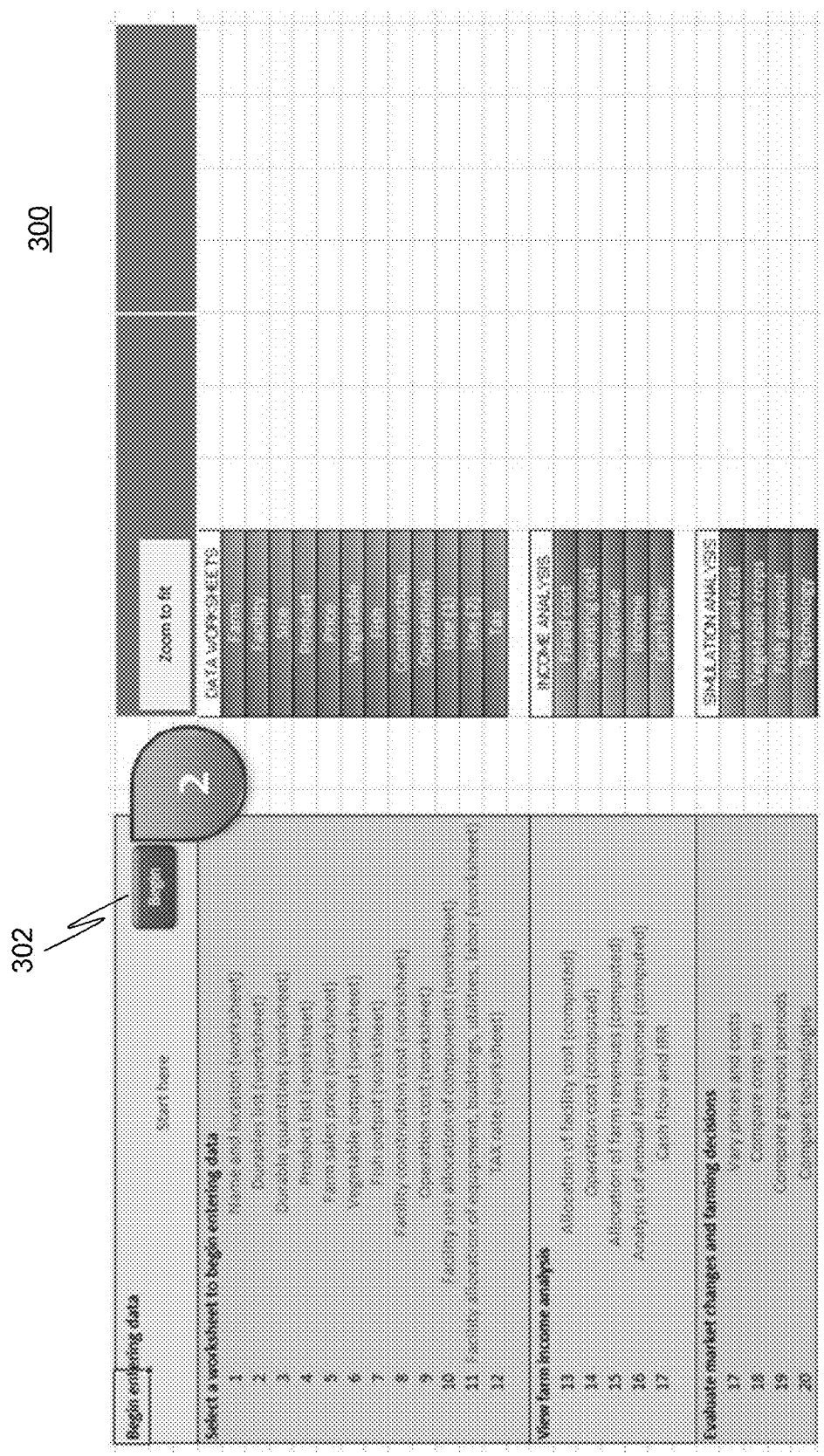
FIG. 3 shows an exemplary worksheet of the software application that may be used by the user to provide data related to a farm, in accordance with an embodiment.

FIG. 3 shows an exemplary worksheet 300 of the software application that may be used by the user to provide data related to a farm, in accordance with an embodiment. Accordingly, the user may click a Begin button 302 when the user is ready to enter data related to the farm. Further, the worksheet 300 lists the multiple worksheets of the software application related to one or more of data entry, farm income analysis and evaluation of market changes and farming decisions.

Figure 4:
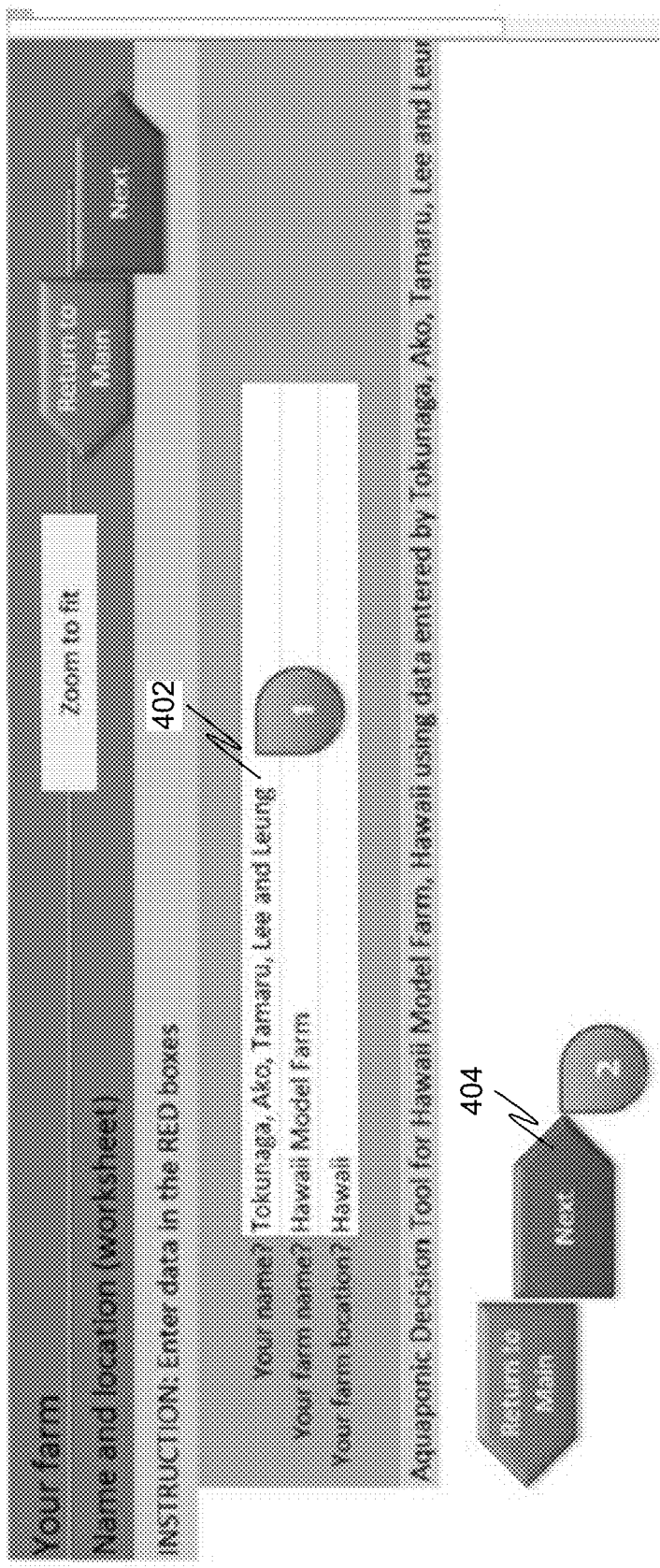
FIG. 4 shows an exemplary name and location worksheet of the software application, in accordance with an embodiment.

FIG. 4 shows an exemplary name and location worksheet 400 of the software application related to data entry, in accordance with an embodiment. Accordingly, the user may enter a name, a farm name, and a farm location in one or more appropriate fields 402. Further, upon entering the appropriate information, the user may click on a Next button 404.

Figure 5:
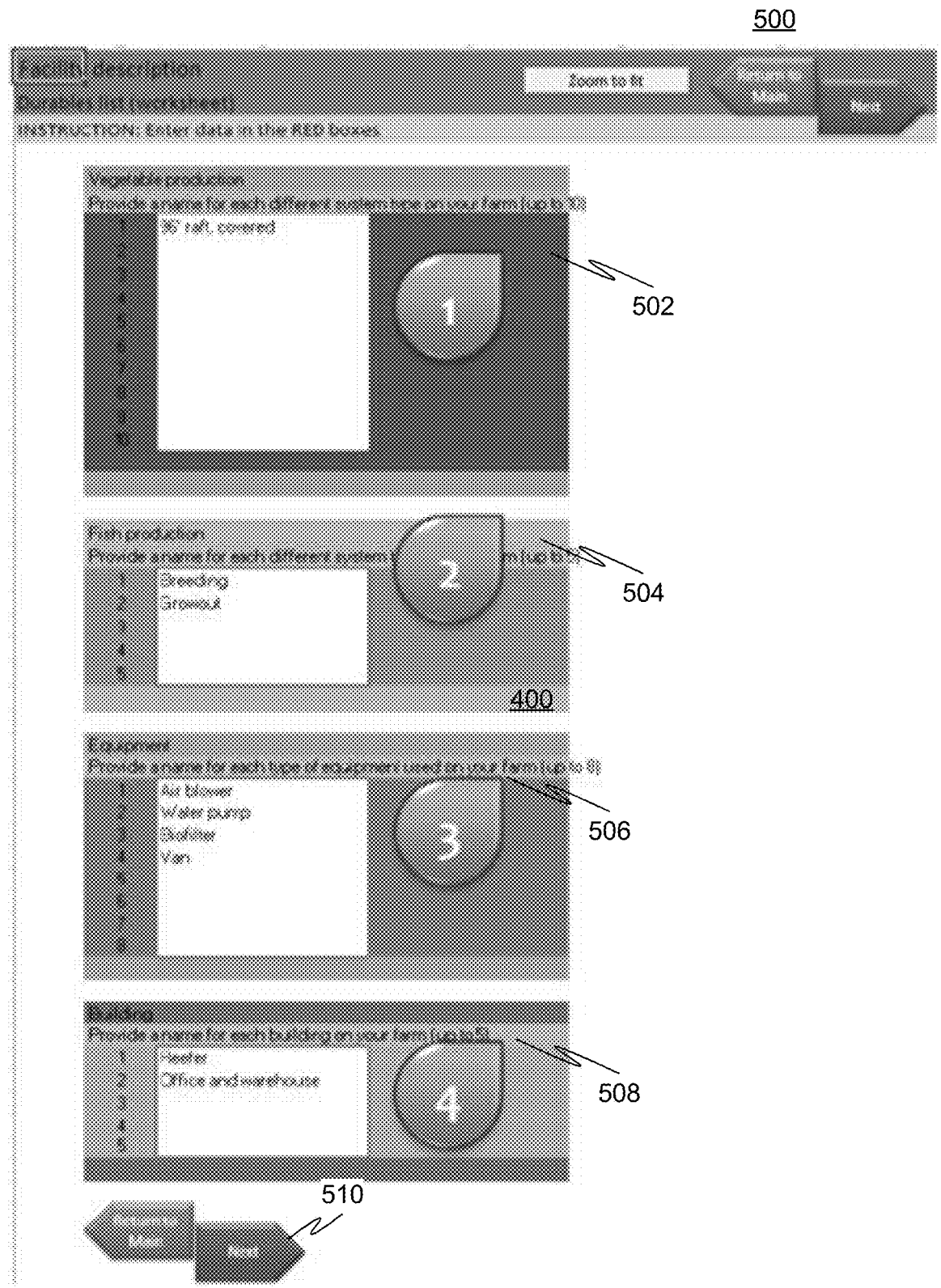
FIG. 5 shows an exemplary durables list worksheet of the software application, in accordance with an embodiment.

FIG. 5 shows an exemplary durables list worksheet 500 of the software application related to data entry, in accordance with an embodiment. The user may enter information about one or more types of raceway that may be used by the user to grow vegetables on the farm in a field 502. A raceway may be a canal for a current of water. Further, the user may enter information about one or more systems that may be used by the user to produce fish in a field 504. Further, the user may list equipment used by the user on the farm to grow vegetables and fish in a field 506, and list one or more buildings on the farm in a field 508. For example, the user may grow vegetables using four different raceway technologies (such as raft, NFT, covered and uncovered lava rock), may have three systems for fish production (such as breeding, hatchery, grow-out), may runs five different types of equipment, and may use space in two buildings. Further, the user may click on a Next button 510.

Figure 6:
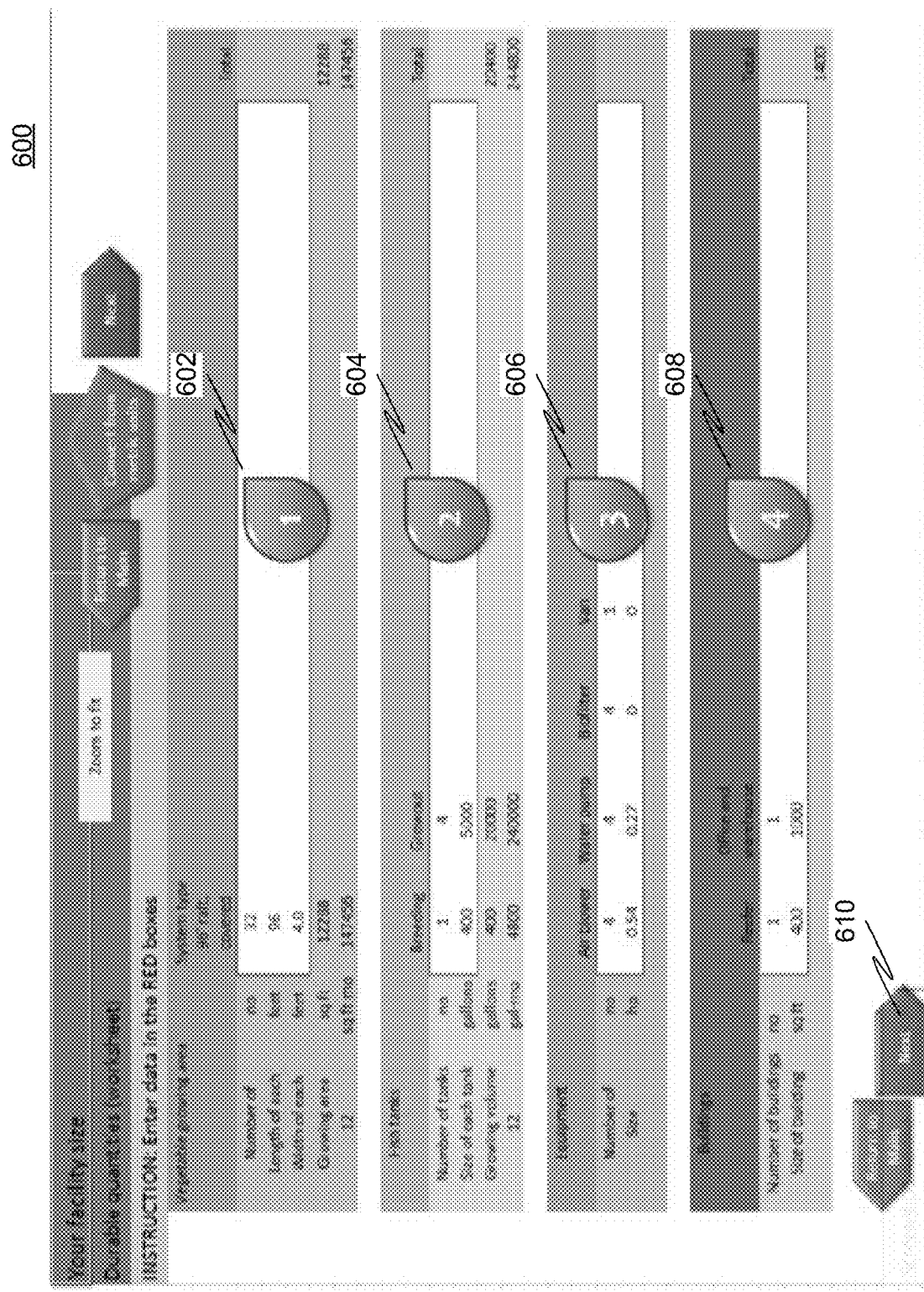
FIG. 6 shows an exemplary durables quantities worksheet of the software application, in accordance with an embodiment.

FIG. 6 shows an exemplary durables quantities worksheet 600 of the software application related to data entry, in accordance with an embodiment. The user may enter information about a one or more types of raceway, such as a number of raceways and a dimension the raceways (such as length and width) in a field 602. Further, the user may enter information related to a one or more systems to produce fish in a field 604, such as information about a number of fish tanks and a volume of the fish tanks. Yet further, the user may enter information about a number and size of each type of equipment in a field 606. Moreover, the user may enter information about a number and size of each type of one or more buildings on the farm in a field 608. For instance, the farm may produce vegetables using 32 raft raceways with dimensions 96' long and 4' wide, may produce fish using one 400-gallon tank for breeding and four 5000-gallon tanks for grow-out. Then the user may click a Next button 610.

Figure 7:
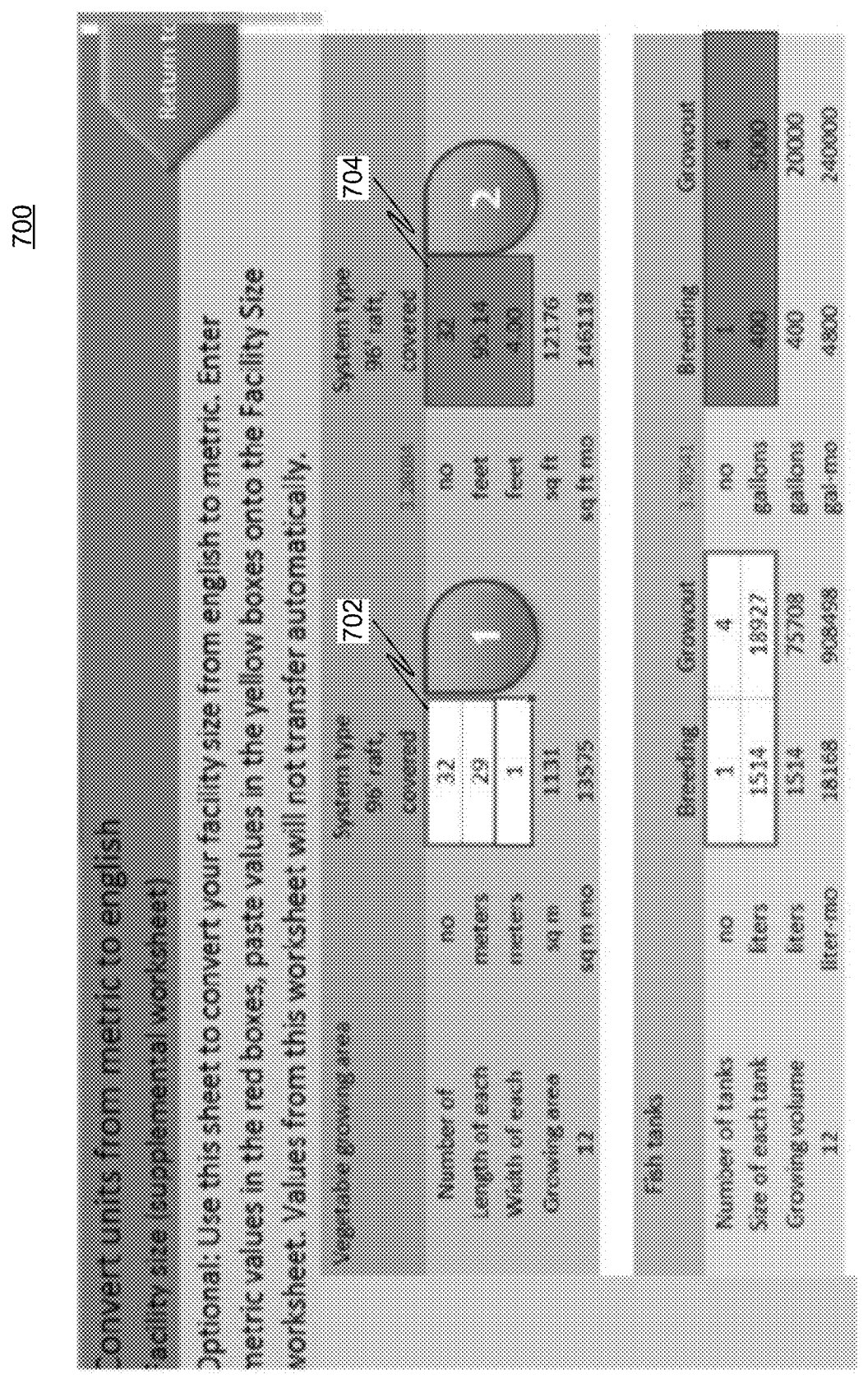

FIG. 7 shows an exemplary facility size worksheet 700 that may allow the user to convert measurements from metric to imperial units, in accordance with an embodiment. The user may enter a size of one or more facilities in the farm, such as a raceway in metric units in a field 702, and view converted values in a field 704.

Figure 8:
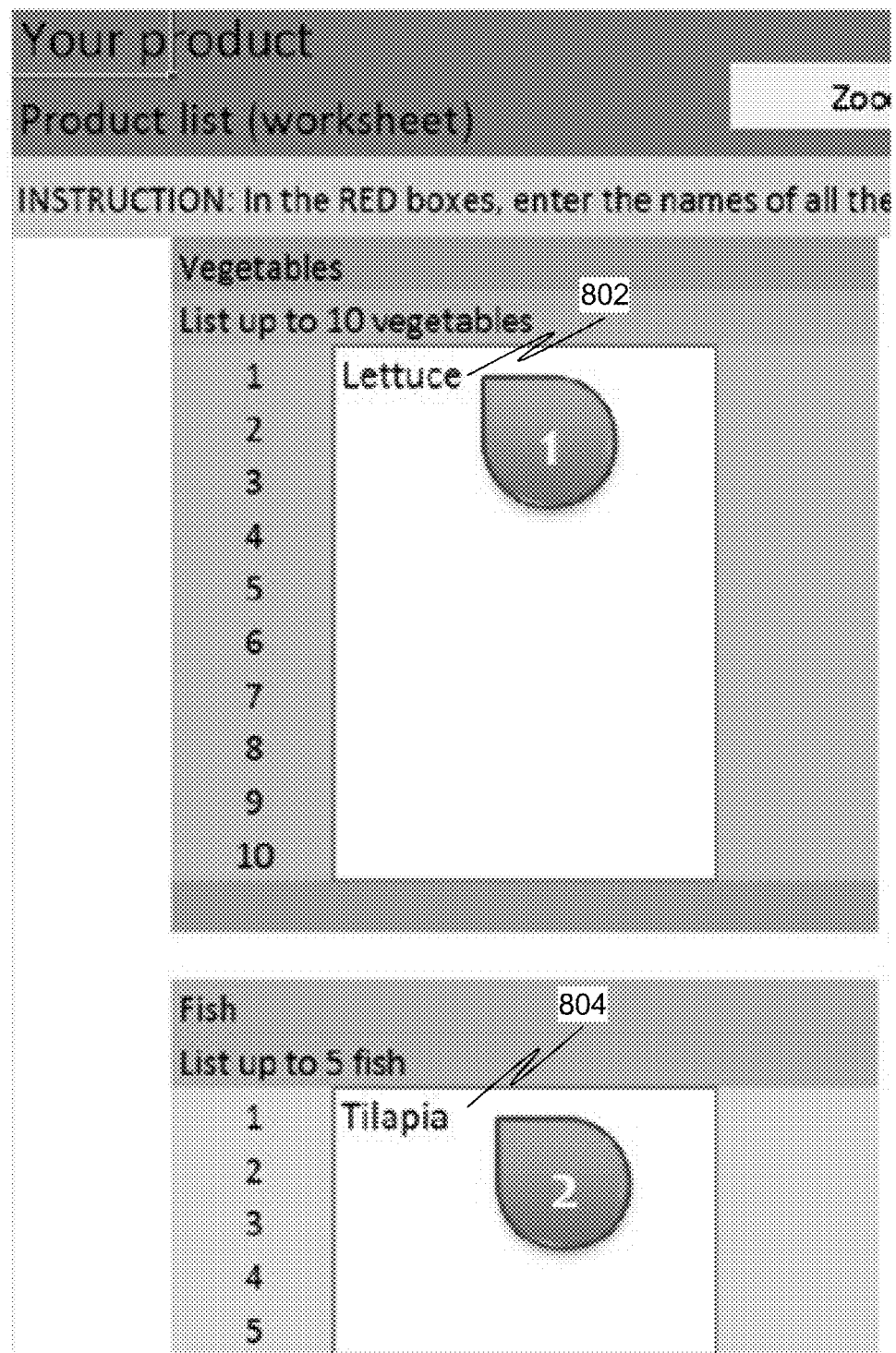
FIG. 8 shows an exemplary product list worksheet of the software, in accordance with an embodiment.

FIG. 8 shows an exemplary product list worksheet 800 of the software application related to data entry, in accordance with an embodiment. The user may list one or more vegetables grown on the farm in a field 802 and one or more types of fish grown on the farm in a field 804. For instance, the user may grow five vegetable crops (Lettuce, Tomato, Spinach, Kale, Cabbage) and five fish crops (Golden tilapia, Cherry tilapia, Sunfish, Golden tilapia fingerlings) on the farm.

Figure 9:
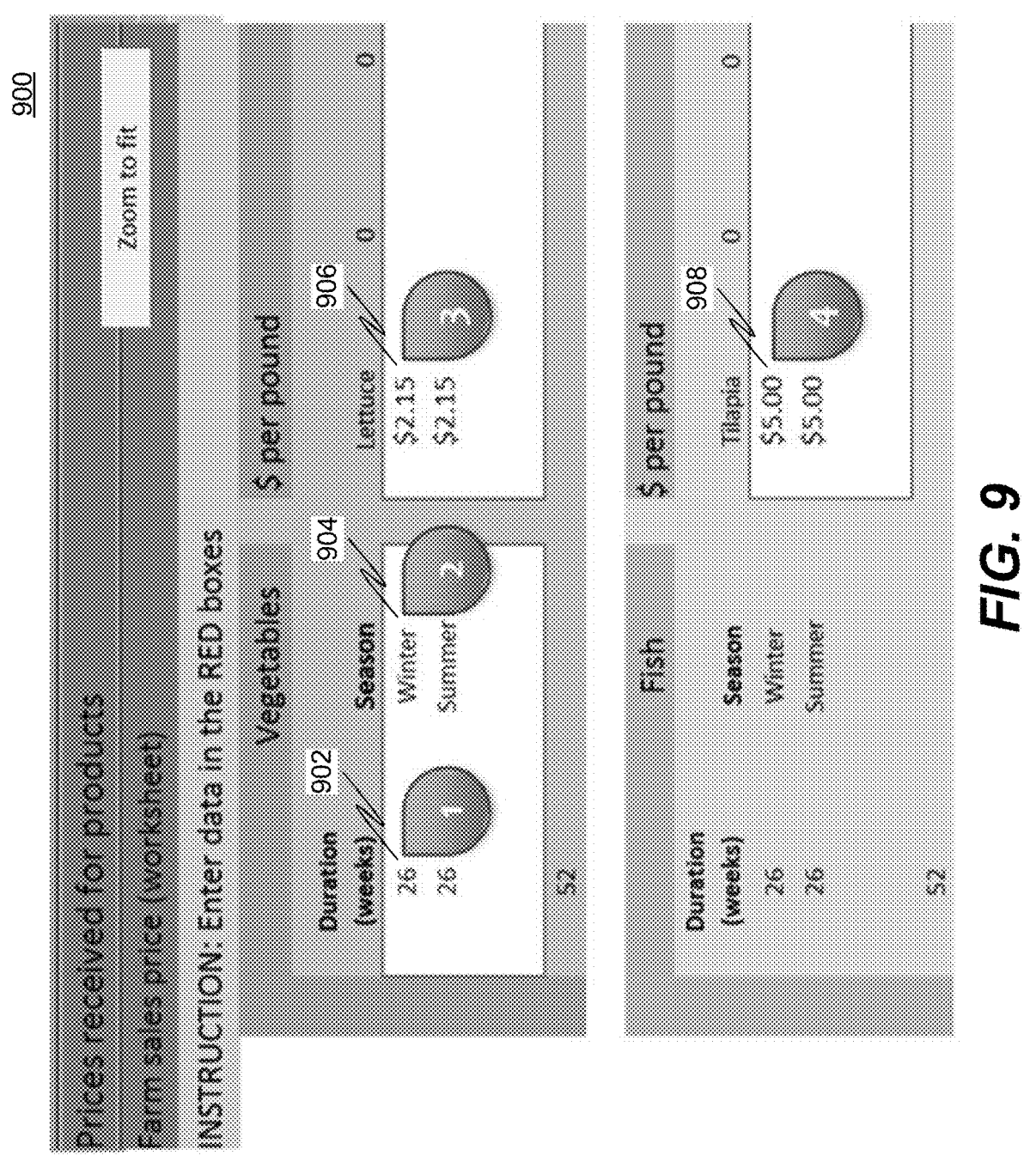

FIG. 9 shows an exemplary farm sales price worksheet 900 of the software application related to data entry, in accordance with an embodiment. The user may enter a number of weeks in a season, such as a winter, in a field 902, a name of a corresponding growing season in a field 904, a price per pound received for vegetables in a field 906, and a price per pound received for fish in a field 908.

Figure 10:
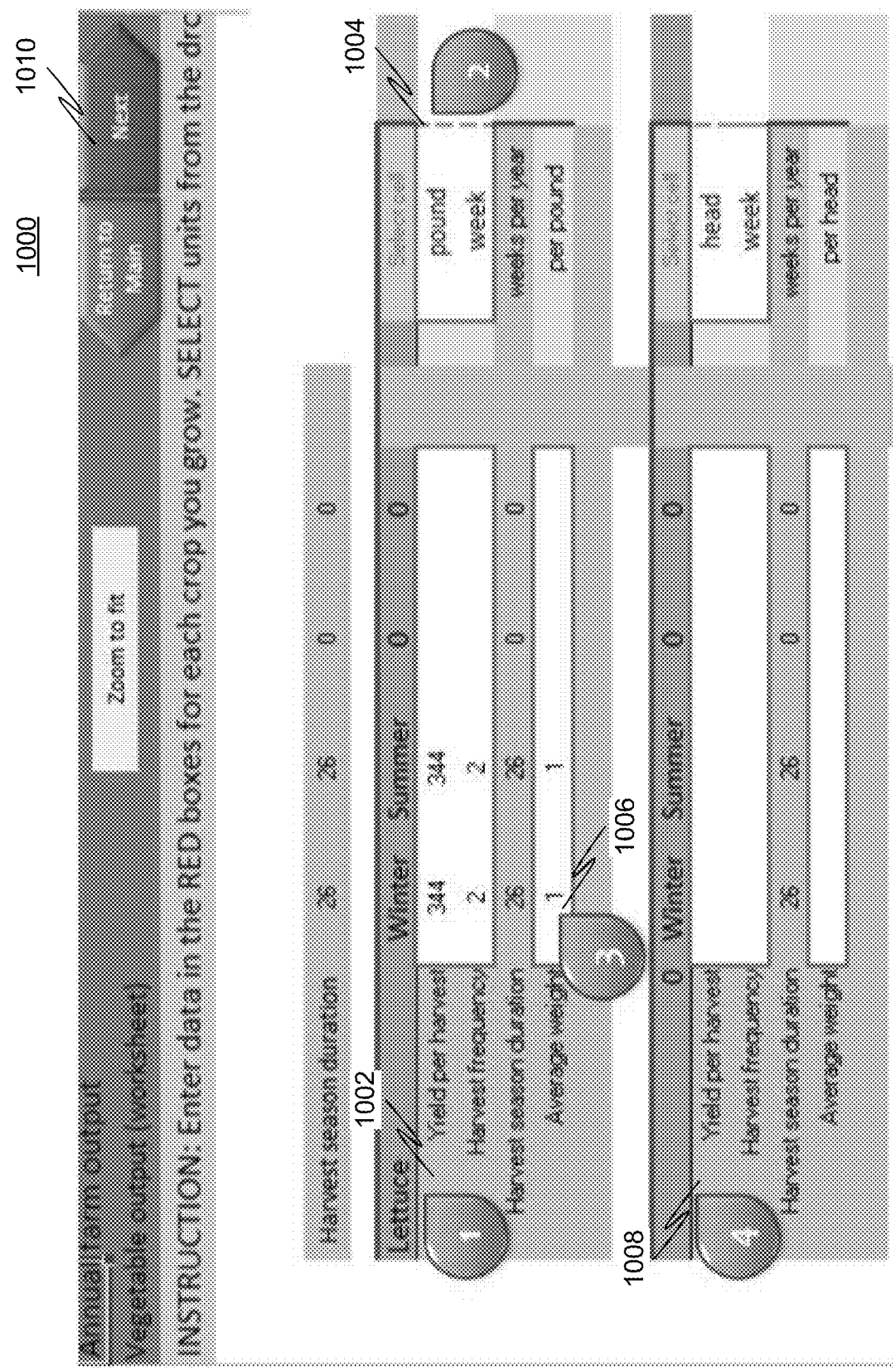
FIG. 10 shows an exemplary vegetable output worksheet of the software application, in accordance with an embodiment.

FIG. 10 shows an exemplary vegetable output worksheet 1000 of the software application related to data entry, in accordance with an embodiment. Accordingly, for each crop and season, the user may enter information on a yield per harvest and frequency of harvest in a field 1002. Then, the user may use a drop-down menu 1004 to select units of measurement. Further, the user may enter an average weight of a harvested crop in a field 1006, and information for another crop in a field 1008. For example, during the winter season, the user may harvest 861 heads of lettuce two times per week. The harvested lettuce may weigh 0.4 pounds per head and 40% of available raceway area may be used to grow the lettuce. Then the user may click a Next button 1010.

Figure 11:
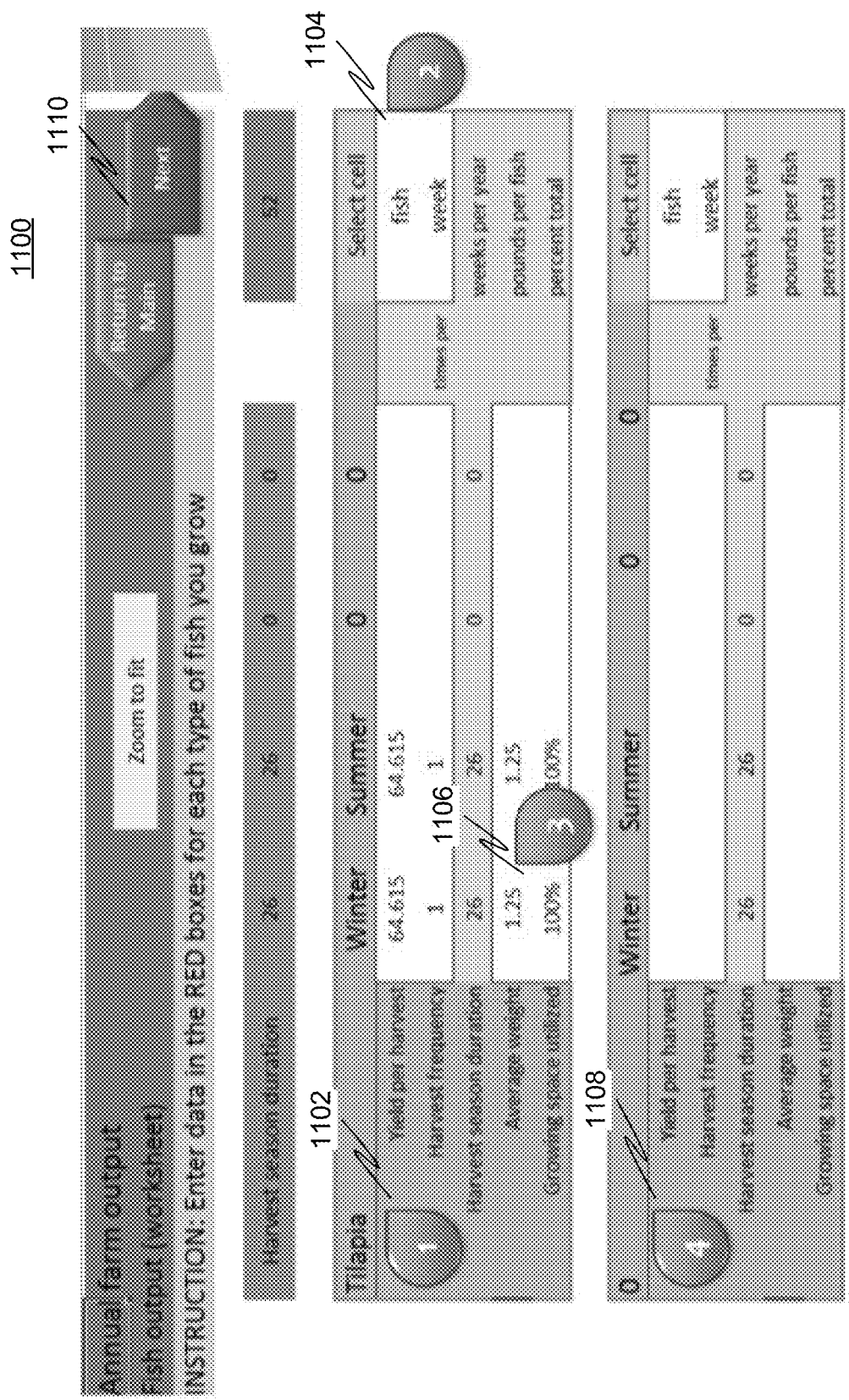
FIG. 11 shows an exemplary fish output worksheet of the software application, in accordance with an embodiment.

FIG. 11 shows an exemplary fish output worksheet 1100 of the software application related to data entry, in accordance with an embodiment. Accordingly, for each fish species and season, the user may enter information on a yield per harvest and frequency of harvest in a field 1102, selects applicable units of measurement from a dropdown list 1104, provide information about an average weight of a harvested fish and % tank capacity allocated to growing one or more fish species in a field 1106. Further, the user may enter information about another fish in a field 1108. Then the user may click a Next button 1110.

Figure 12:
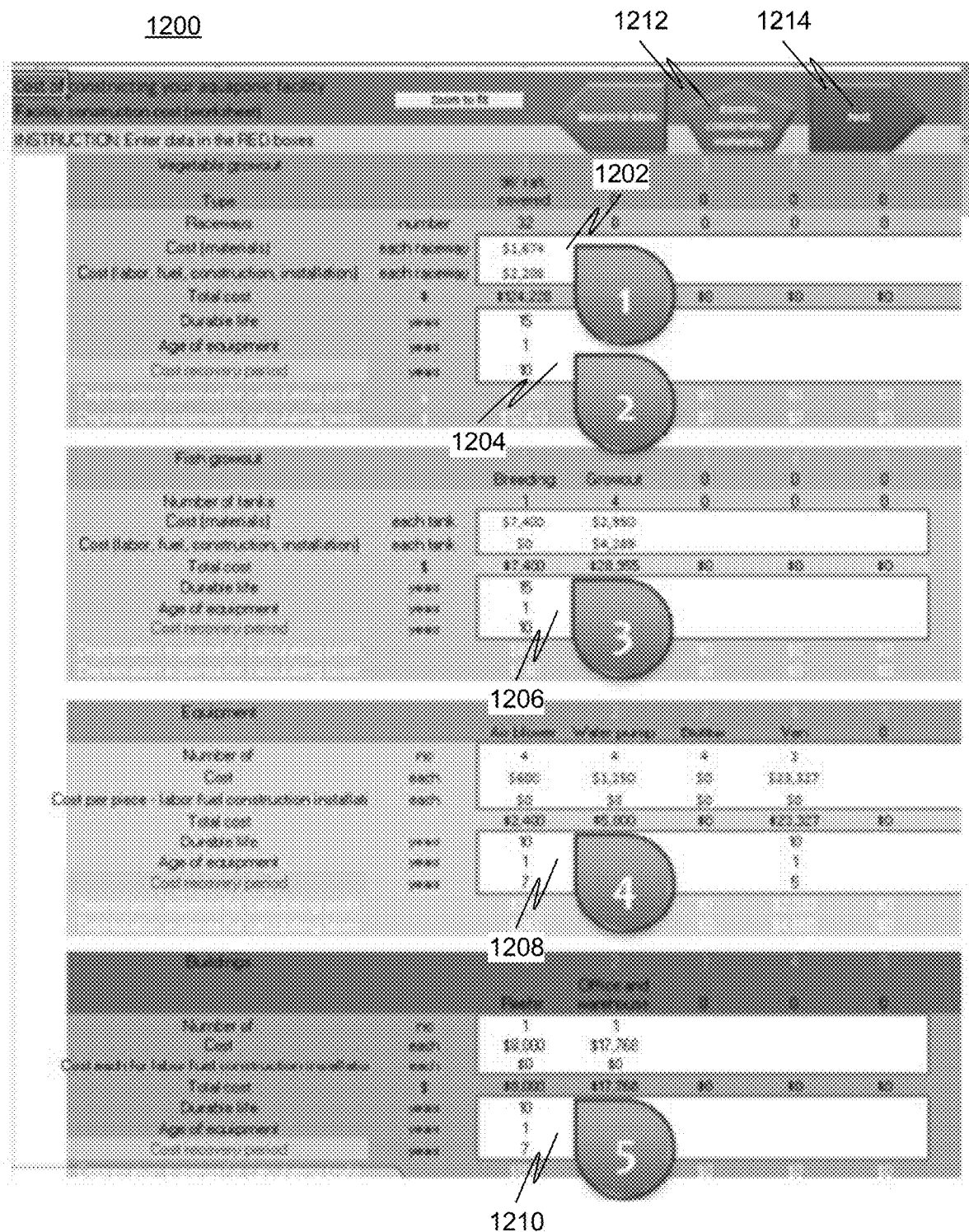
FIG. 12 shows an exemplary facility construction worksheet of the software application, in accordance with an embodiment.

FIG. 12 shows an exemplary facility construction worksheet 1200 of the software application related to data entry, in accordance with an embodiment. Accordingly, the user may enter information about a cost to construct one or more raceways in the farm in a field 1202. If the user wishes to list costs separately, then the user may click an Itemize construction materials button 1212, copy a total cost from a worksheet, and paste in the appropriate field. Further, the user may enter information on how many years each raceway may last before the raceway may need to be replaced in a field 1204. Further, the user may indicate an age of the one or more raceways. Yet further, the user may enter information about a durability and an age of the one or more fish tanks in a field 1206, information on a durability and an age of equipment in a field 1208, and information about a durability and an age of one or more farm buildings in a field 1210. Then the user clicks a Next button 1214. For example, the user may have spent $1674 on materials and $1674 on labor and fuel for each raft raceway for a total expenditure of $107,136 for 32 rafts raceways. The useful life of the raft raceways may be 17 years and the rafts may be 5 years old. For tax purposes, the user may fully depreciate the cost of this asset over 7 years.

Figure 13:
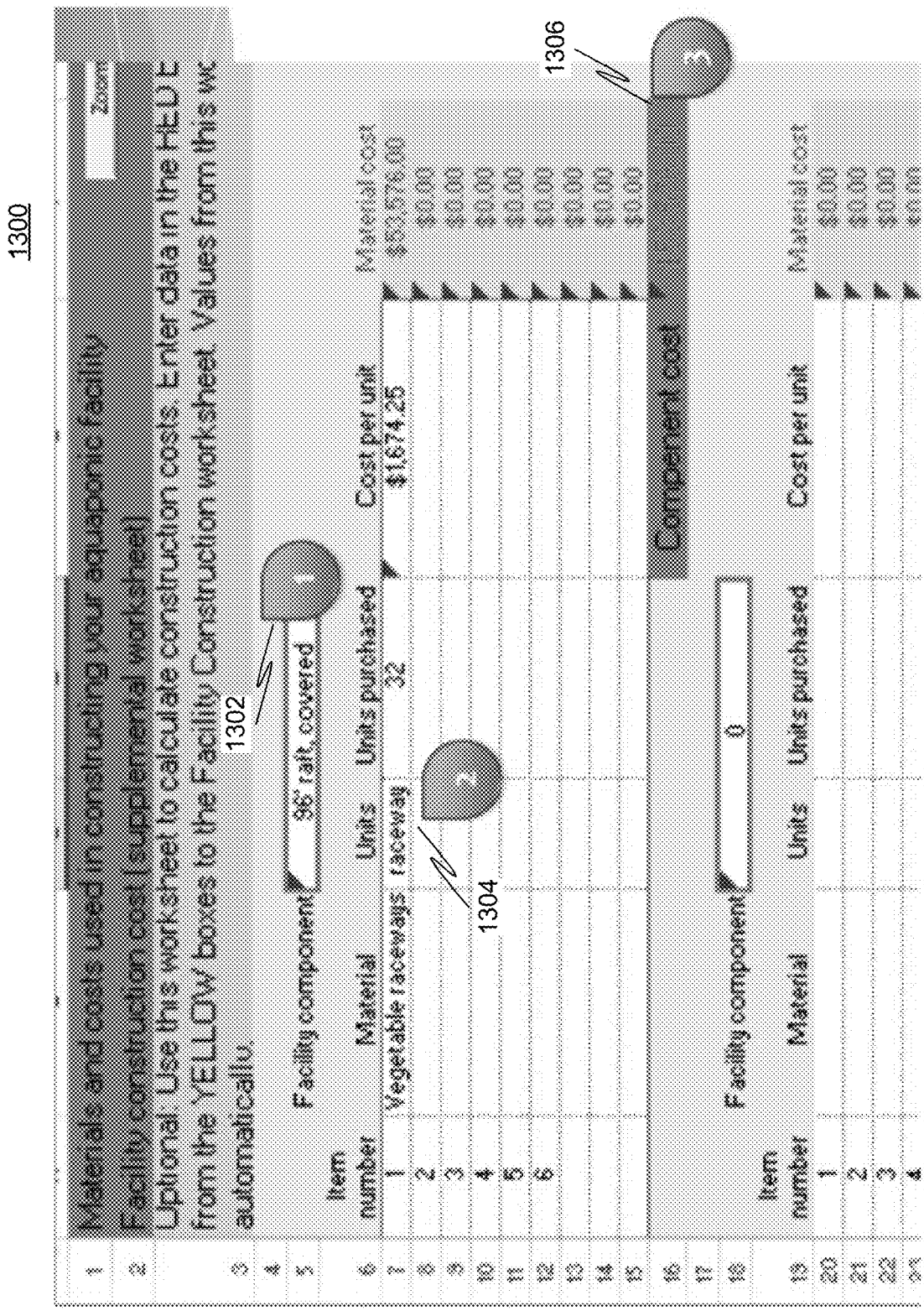
FIG. 13 shows an exemplary facility construction supplemental worksheet of the software application, in accordance with an embodiment.

FIG. 13 shows an exemplary facility construction supplemental worksheet 1300 of the software application that may help the user to itemize and compute total construction costs, in accordance with an embodiment. Accordingly, the user may enter a type of a raceway, tank, equipment, or building for which the user would like to itemize construction costs in a field 1302. Further, the user may list the materials, measurement units, number of units purchased, and unit costs in a field 1304. The component cost may appear in a box 1306.

Figure 14:
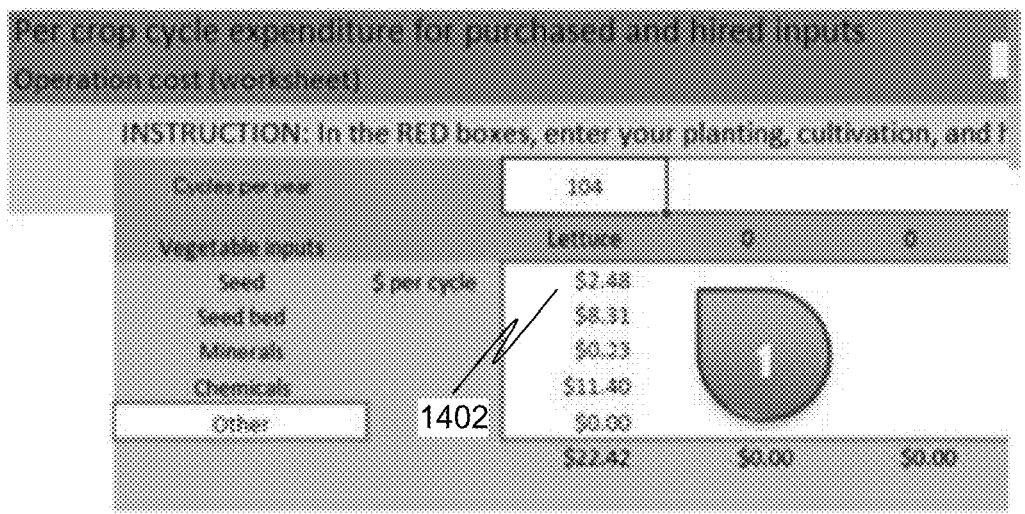
FIG. 14 shows an exemplary operation cost worksheet of the software application, in accordance with an embodiment.
Figure 14:
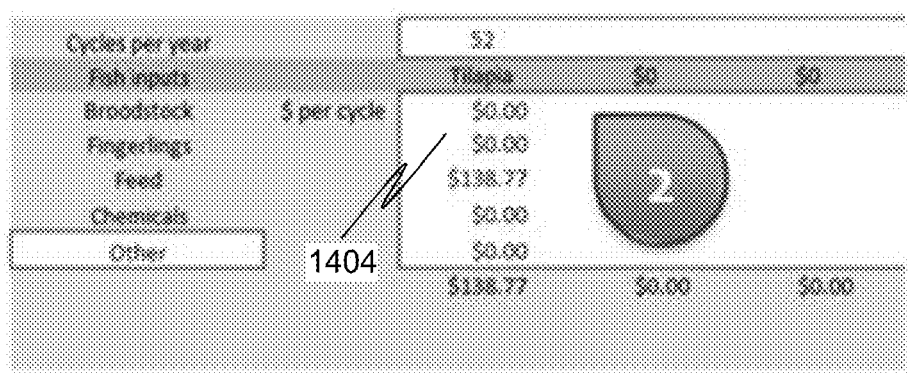
Figure 14:
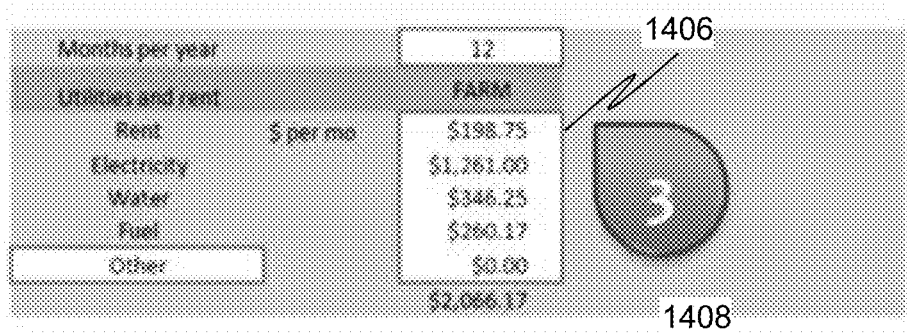
Figure 14:
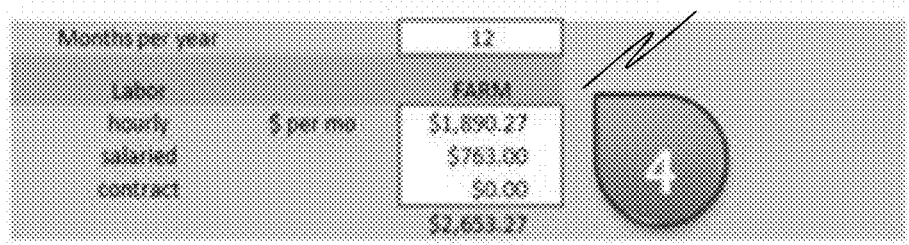

FIG. 14 shows an exemplary operation cost worksheet 1400 of the software application related to data entry, in accordance with an embodiment. Accordingly, the user may enter input cost for growing vegetables in a field 1402, and input cost for growing fish in a field 1404. Further, the user may enter utility costs of the farm in a field 1406, and labor costs of the farm in a field 1408. For example, the farm may allow for harvesting lettuce 100 times per year (twice per week, 50 weeks per year). At each cultivation cycle, the user may spend $10 on seed, $1 on bedding materials, and $12 on minerals. Further, the farm may harvest golden tilapia once per week, 50 weeks per year. Feed costs may be estimated to be $144. Then the user may click a Next button.

Figure 15:
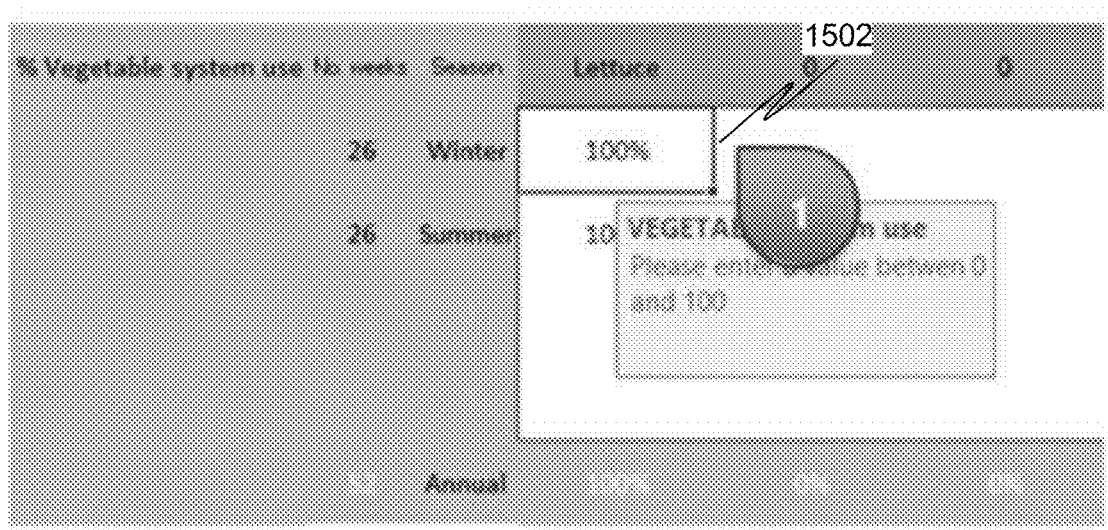
FIG. 15 shows an exemplary facility use allocation of components worksheet of the software application, in accordance with an embodiment.
Figure 15:
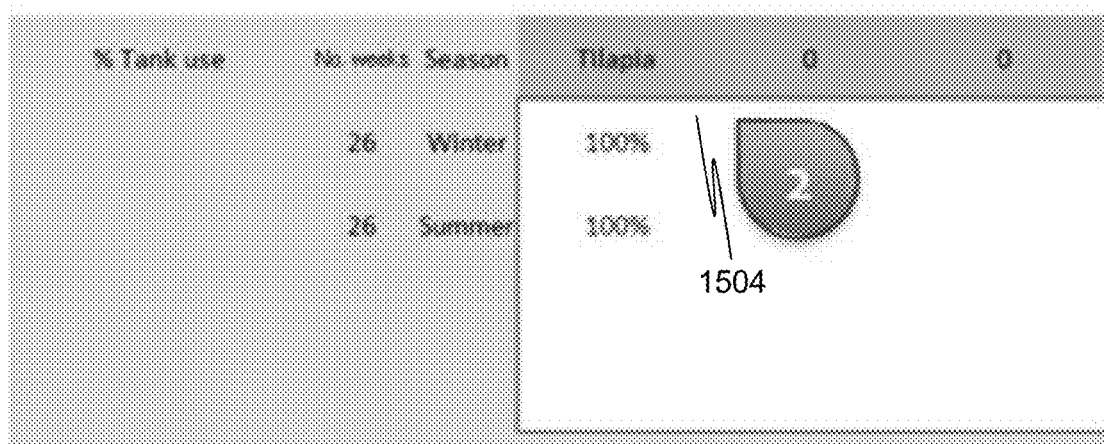

FIG. 15 shows an exemplary facility use allocation of components worksheet 1500 of the software application related to data entry, in accordance with an embodiment. Accordingly, for each vegetable produced on the farm, the user may enter information on a percentage of total growing space allocated during each season in a field 1502. Further, for each fish species produced on the farm, the user may enter information on a total tank space allocated during each season in a field 1504.

Figure 16:
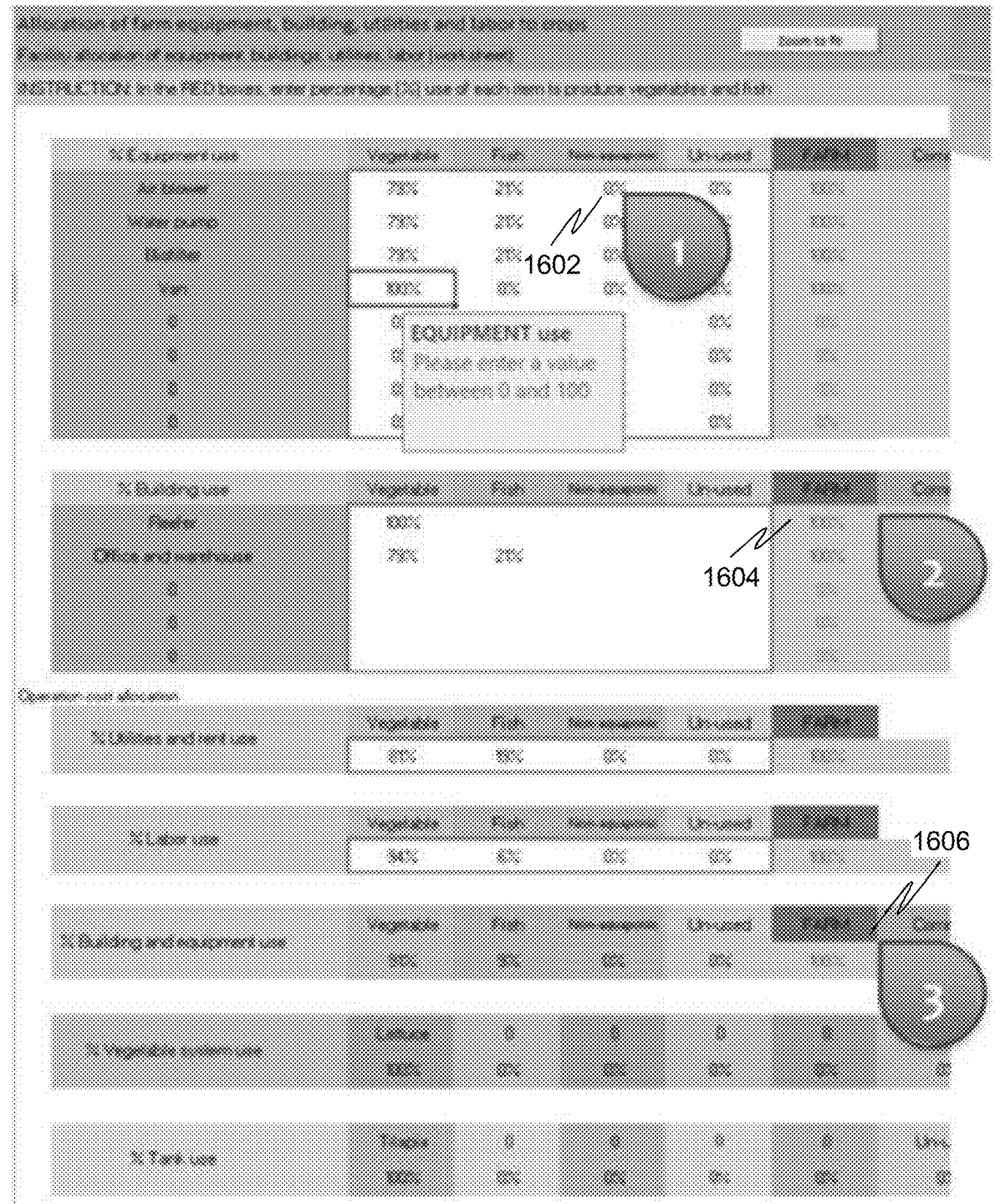
FIG. 16 shows an exemplary facility allocation of equipment, buildings, utilizes, labor worksheet of the software application, in accordance with an embodiment.
Figure 17:
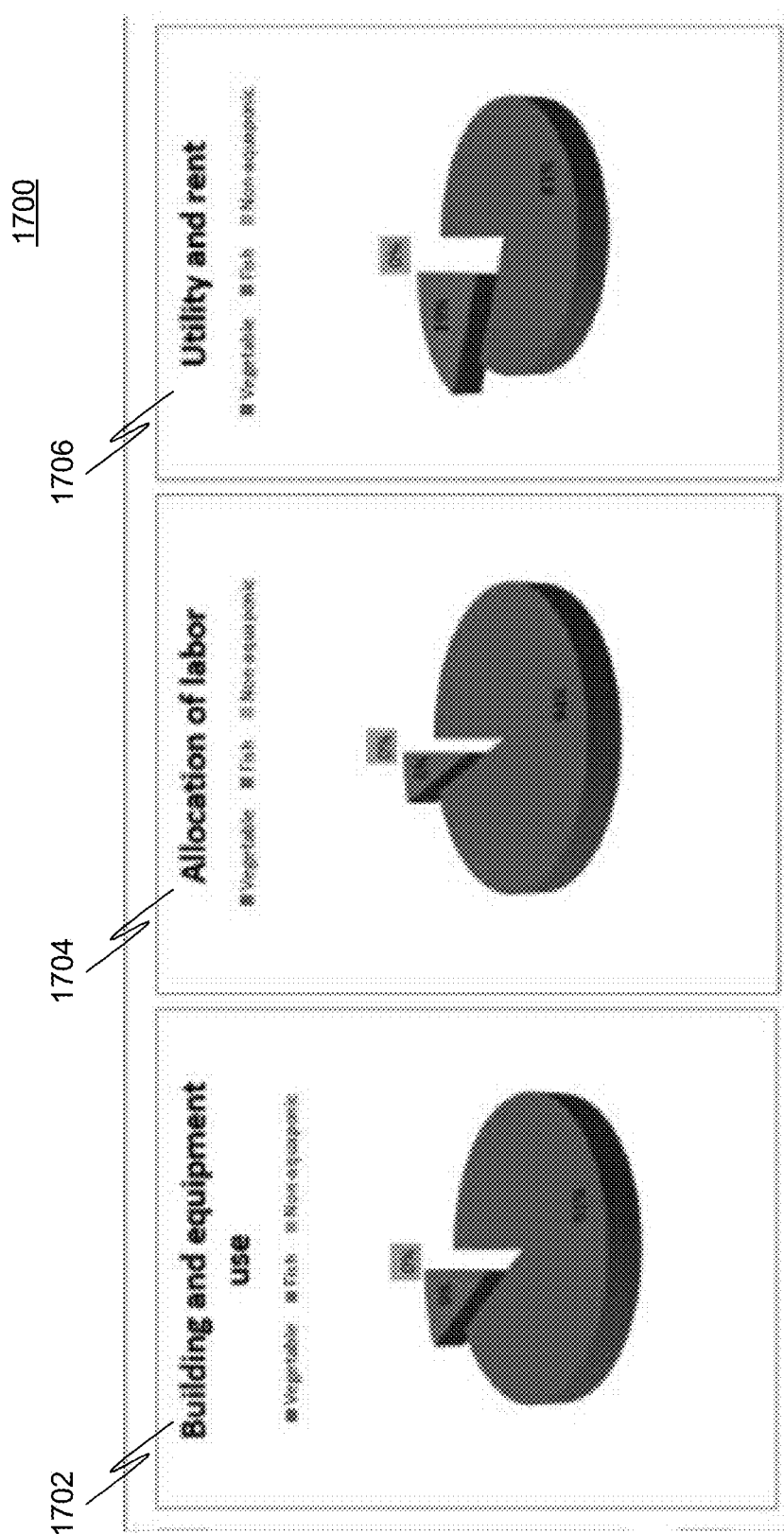
FIG. 17 shows a graphical visualization such as displaying pie charts, in accordance with an embodiment.

FIG. 16 shows an exemplary facility allocation of equipment, buildings, utilizes, labor worksheet 1600 of the software application related to data entry, in accordance with an embodiment. Accordingly, corresponding to equipment, building, utilities, and labor, the user may enter values based on how each utility may be used in producing vegetables, fish, and other on the farm in a field 1602. A right-hand column 1604 may need to add up to 100%. Then a summary of the information entered by the user may be displayed in a field 1606. Accordingly, graphical visualizations 1700 including 1702, 1704, and 1706 displaying pie charts showing building and equipment use, allocation of labor, and utility and rent respectively may be generated (as shown in FIG. 17) corresponding to the information displayed in the field 1606.

Figure 18:
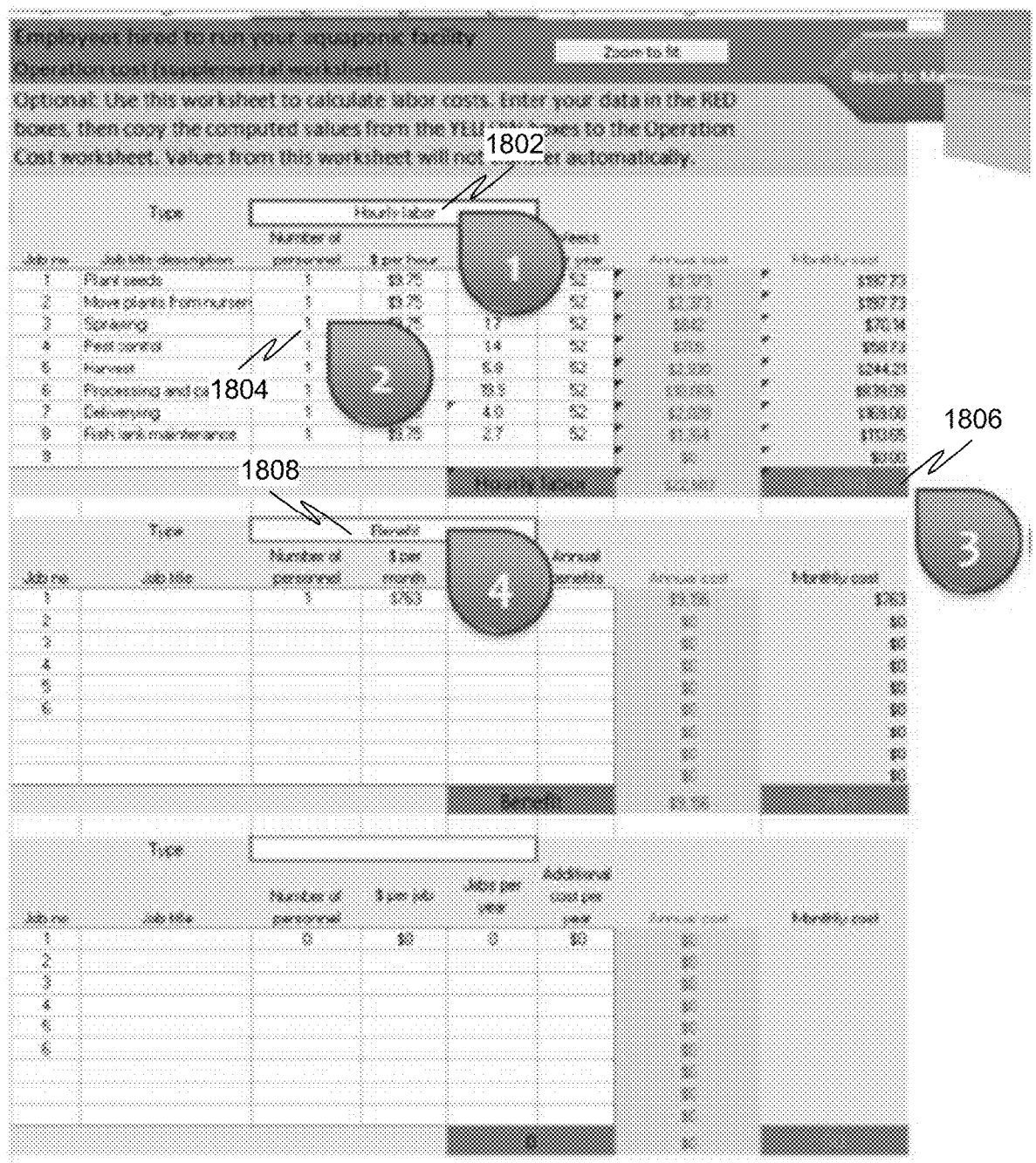
FIG. 18 shows an exemplary operation cost supplemental worksheet of the software application, in accordance with an embodiment.

FIG. 18 shows an exemplary operation cost supplemental worksheet 1800 of the software application that may help the user to itemize and compute labor expenses, in accordance with an embodiment. The user may enter a type of labor hired in a field 1802, and provide information on employee job titles, number of people hired, hourly wages, hours per week, and weeks employed per year in a field 1804. A labor expense may be totaled automatically and displayed in a field 1806. Further, benefit may be displayed in a field 1808.

Figure 19:
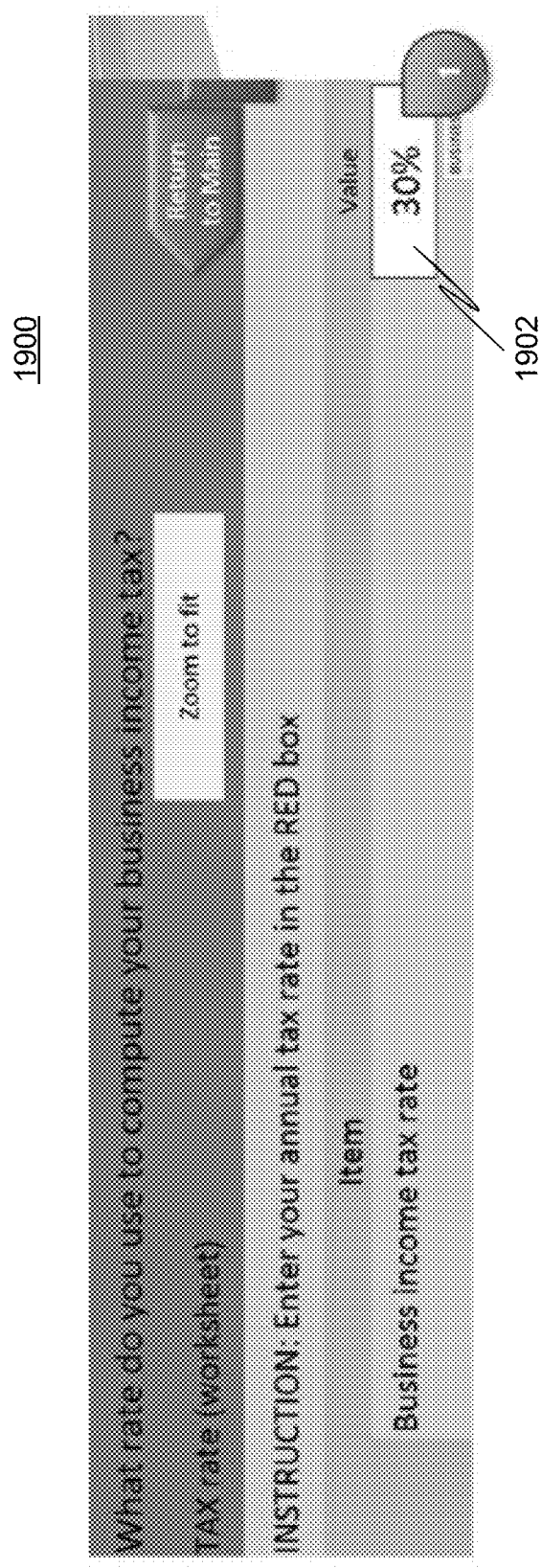
FIG. 19 shows an exemplary tax rate worksheet of the software application, in accordance with an embodiment.

FIG. 19 shows an exemplary tax rate worksheet 1900 of the software application related to data entry, in accordance with an embodiment. The user may enter a business income tax rate in a field 1902.

Further, once the user enters information in the exemplary worksheets 300-1900 shown in FIGS. 3-19, an analysis may be generated of the farm costs, revenue, and income. The analysis may appear on one or more exemplary worksheets, such as with summary tables and graphics, as shown in FIGS. 20-23. At any time, the user may go back to any data entry worksheet to make changes or corrections. The summary tables and graphics may be updated automatically.

Figure 20:
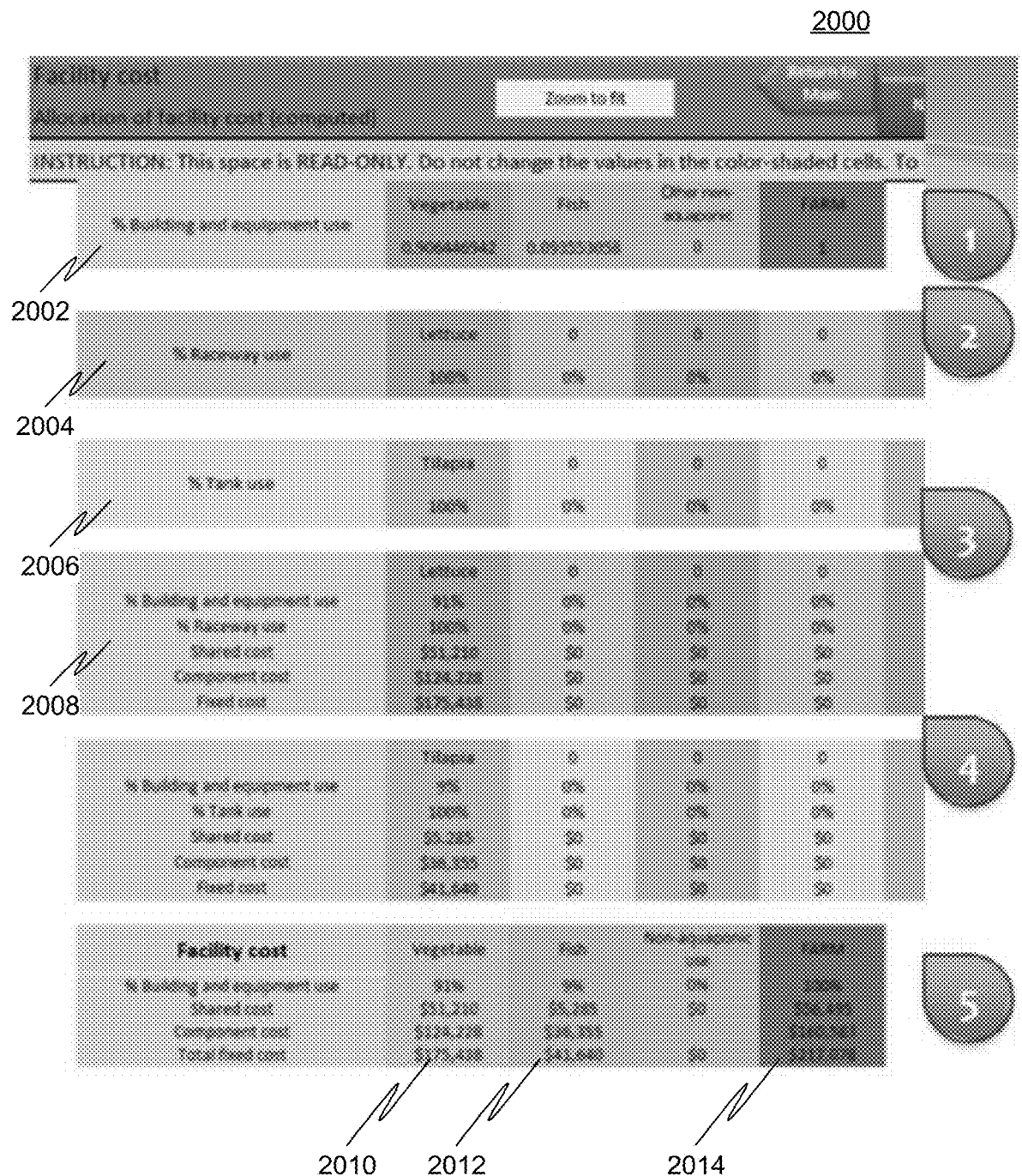
FIG. 20 shows an exemplary allocation of facility cost (computed) worksheet of the software application, in accordance with an embodiment.

FIG. 20 shows an exemplary allocation of facility cost (computed) worksheet 2000 of the software application related to farm income analysis, in accordance with an embodiment. Accordingly, the analysis may provide information about allocation of durable assets to production of vegetables and fish in a field 2002, allocation of vegetable raceway space to vegetable crops in a field 2004, and allocation of tank space to fish crops in a field 2006. Further, the analysis may display distribution and total fixed costs in a field 2008, distribution of fixed costs to vegetable crops in a field 2010, distribution of fixed costs fish crops in a field 2012, and distribution of total farm fixed costs to vegetables and fish in a field 2014. Then the user may click a Next button. For example, on a farm, 63% of buildings and equipment (shared durable assets) may be used to produce of vegetables, 36% may be used to produce fish. 40% of raceway space may be used to produce lettuce. Further, 100% of tank capacity may be used to produce Golden tilapia. Lettuce fixed costs may be $60,801 and golden tilapia fixed costs may be $64,161.

Figure 21:
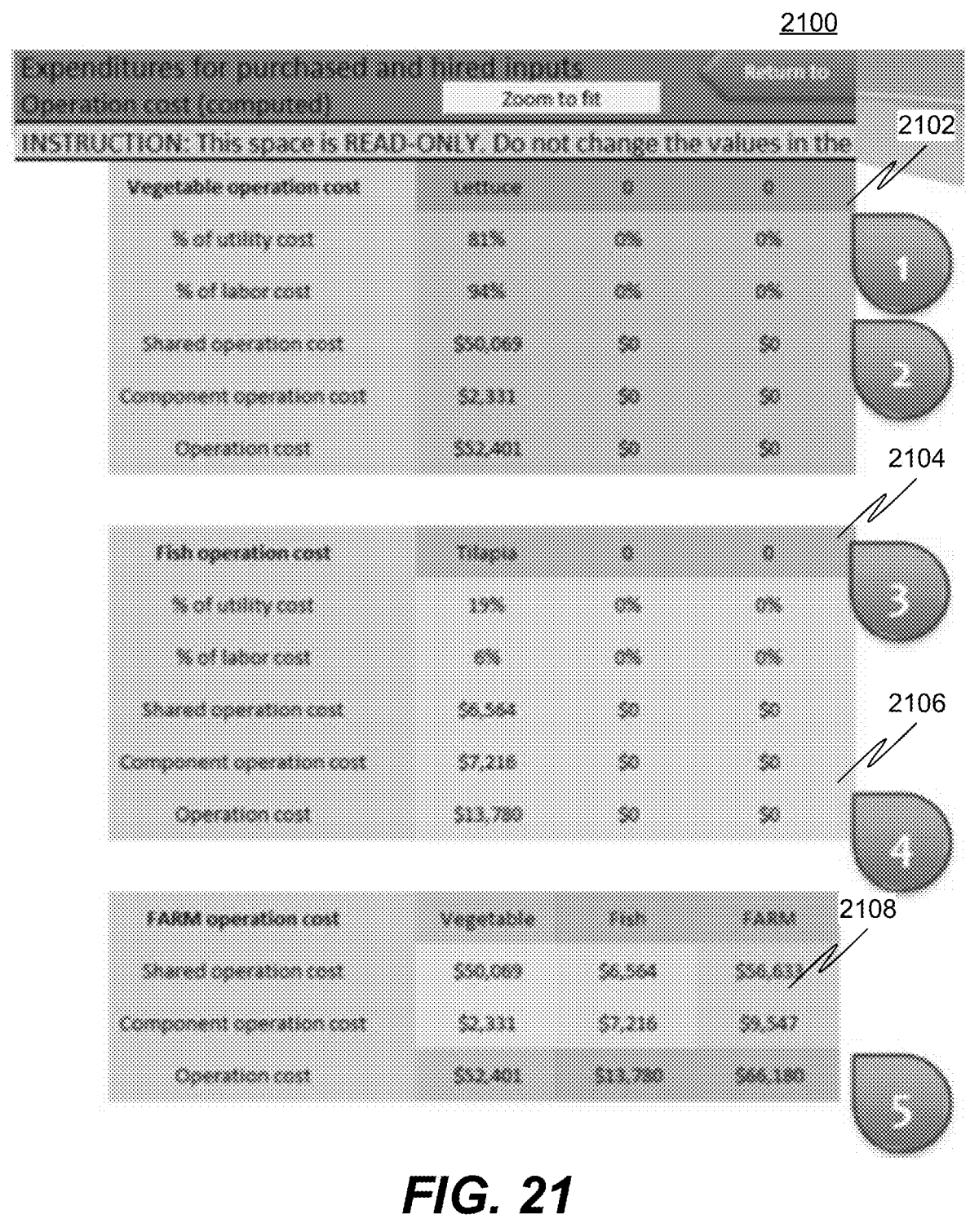

FIG. 21 shows an exemplary operation cost (computed) worksheet 2100 of the software application related to farm income analysis, in accordance with an embodiment. As shown in FIG. 21, the analysis may provide information about operation cost of producing vegetables in a field 2102, operation cost of producing fish in a field 2104, whole farm operation cost in a field 2106, and total operation cost in a field 2108. Further, the user may click a Next button. For example, on a farm, Lettuce may cost $992 for seed, bedding, etc. and $9,062 for shared use of buildings and equipment for a total operation cost of $9,994. Combined operation cost for lettuce, tomato, and spinach may be $25,201. Golden tilapia cost may be $7,216 for fingerling, feed, etc. and $33,982 for shared use of buildings and equipment for a total operation cost of $41,198. Whole farm operation cost may be $66,398 per year.

Figure 22:
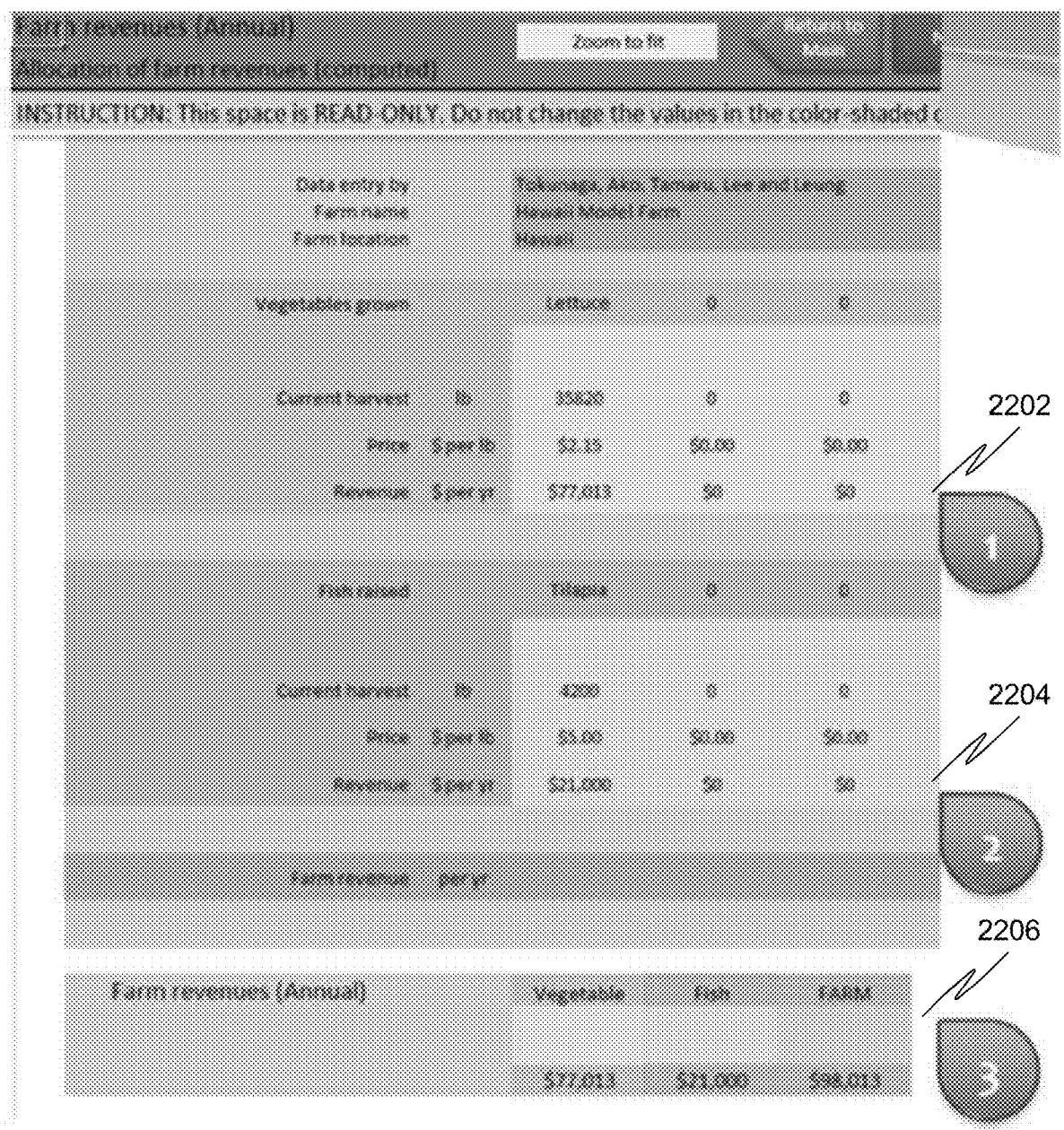
FIG. 22 shows an exemplary allocation of farm revenues (computed) worksheet of the software application, in accordance with an embodiment.

FIG. 22 shows an exemplary allocation of farm revenues (computed) worksheet 2200 of the software application related to farm income analysis, in accordance with an embodiment. Accordingly, the analysis may provide information about annual revenue from vegetable sales in a field 2202, annual revenue from fish sales in a field 2204, and distribution of annual farm revenue in a field 2206. For example, on sample farm, annual revenue from all vegetable sales may be $77,013. Annual revenue from fish sales may be $21,000 and whole farm revenue may be $98,013.

Figure 23:
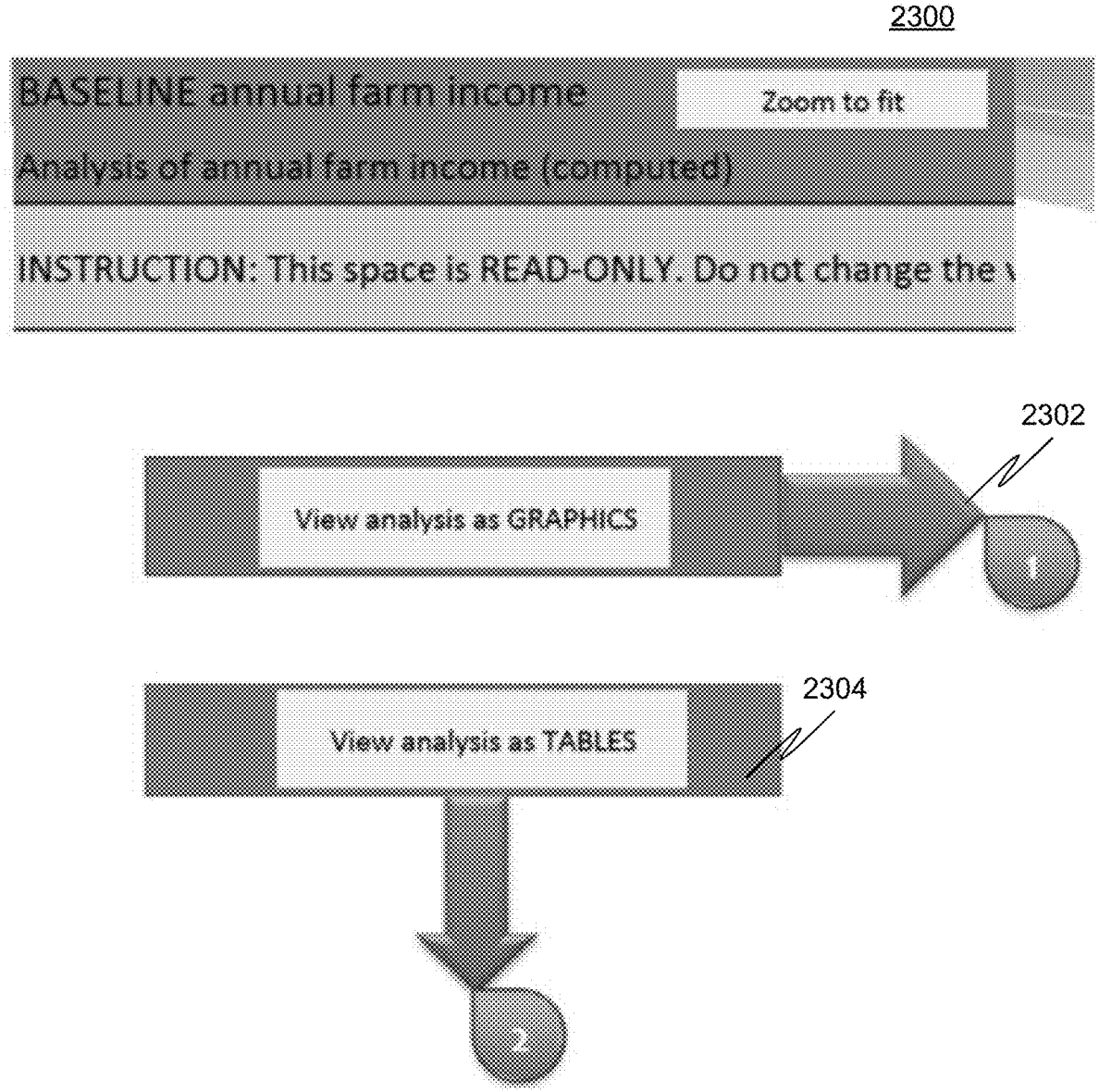
FIG. 23 shows an exemplary analysis of annual farm income (computed) worksheet of the software application, in accordance with an embodiment.

FIG. 23 shows an exemplary analysis of annual farm income (computed) worksheet 2300 of the software application related to farm income analysis, in accordance with an embodiment. Accordingly, the analysis may provide results from income analysis. The user may choose a format of graphs 2302, or tables 2304. For the graphs, the user can choose the results to display from the drop-down menus. For example, a farm may incur $66000 in costs each year to earn $11 thousand in after-tax profits (rounded values).

Further, if the user wishes to make some changes to the farm and is interested in knowing how those changes may affect the costs, revenue, and income, simulation analysis may be performed, and may be displayed on one or more exemplary worksheets, and as graphs and charts, such as worksheets and graphs shown in FIGS. 24-31. The user may decide one or more vegetable crops to grow, size of the fish harvest, type of technology to use in vegetable production and how to make changes in financing, costs, and prices affect MIRR.

Figure 24:
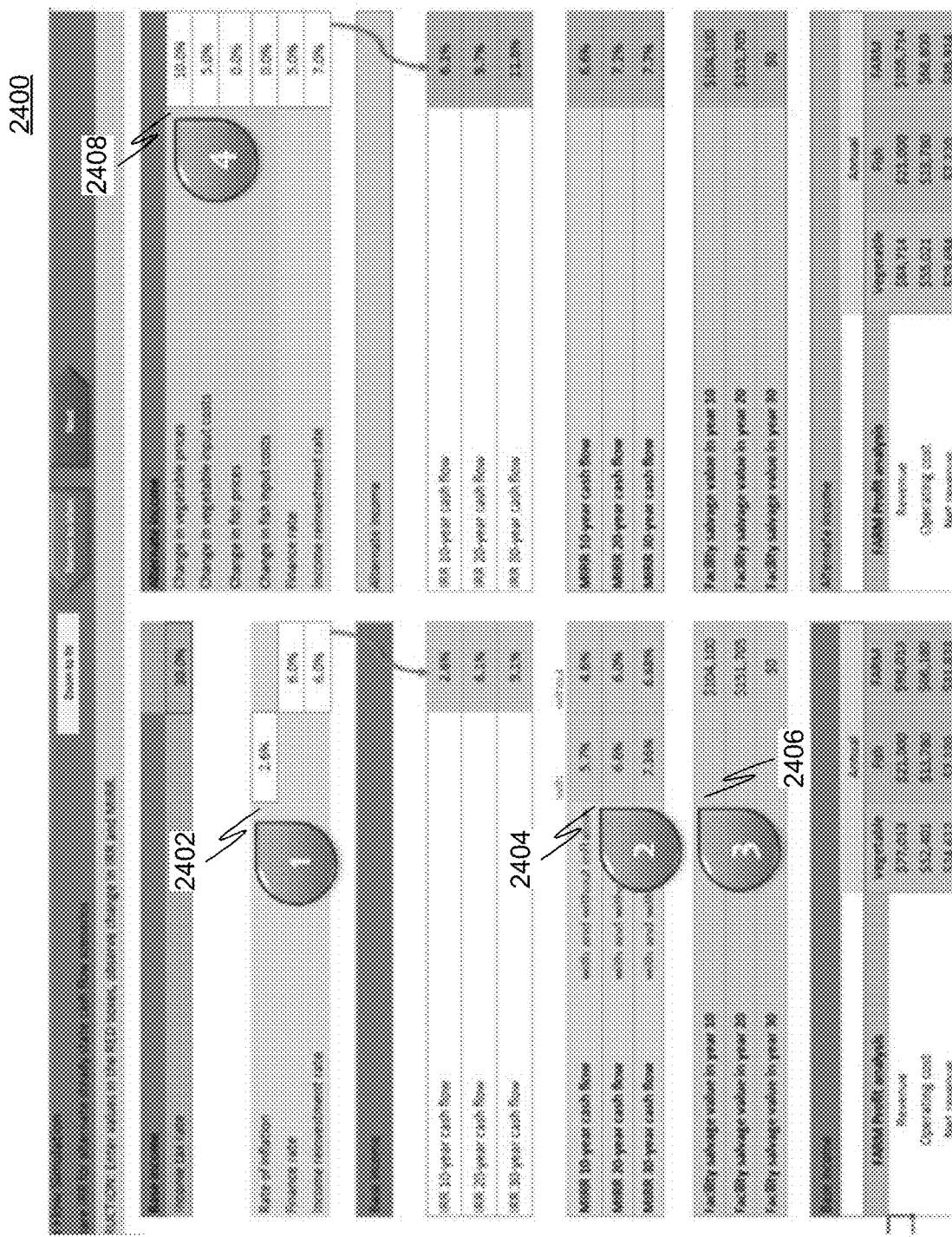
FIG. 24 shows an exemplary cash flow simulation worksheet of the software application, in accordance with an embodiment.

FIG. 24 shows an exemplary cash flow simulation worksheet 2400 of the software application related to simulation analysis and farming decisions, in accordance with an embodiment. Accordingly, simulation analysis may include using a cash flow simulation tool. The user may enter an inflation rate, a finance rate (cost of capital) and a return rate on reinvested income in a field 2402. The computed modified internal rate of return (MIRR) may be shown in a field 2404. Further, salvage values may be shown in a field 2406. Further, the user may enter values to simulate changes in sales prices and input costs in a field 2408. For example, for a farm, the MIRR over 20 years may be 6%. When prices and costs increase, MIRR may rise to 10%.

Figure 25:
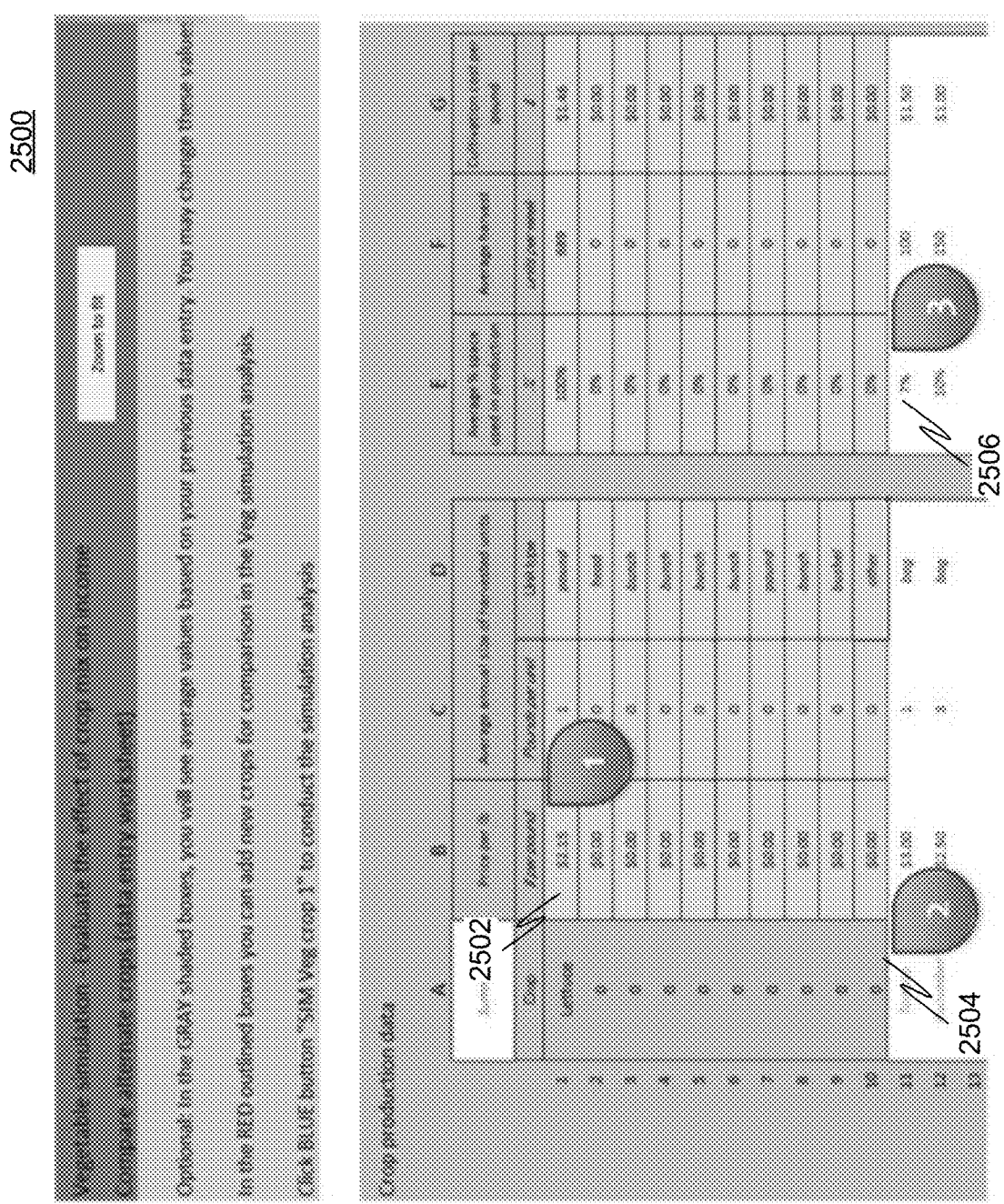
FIG. 25 shows an exemplary vegetable simulation worksheet of the software application, in accordance with an embodiment.

FIG. 25 shows an exemplary vegetable simulation worksheet 2500 of the software application related to simulation analysis and farming decisions, in accordance with an embodiment. Accordingly, the simulation analysis may include receiving vegetable simulation input. A field 2502 may display one or more values entered by the user. The user may enter information for additional crops for the simulation analysis in a field 2504. Further, if the user enters a new crop, then the user may also need to enter space requirements in a field 2506.

Figure 26:
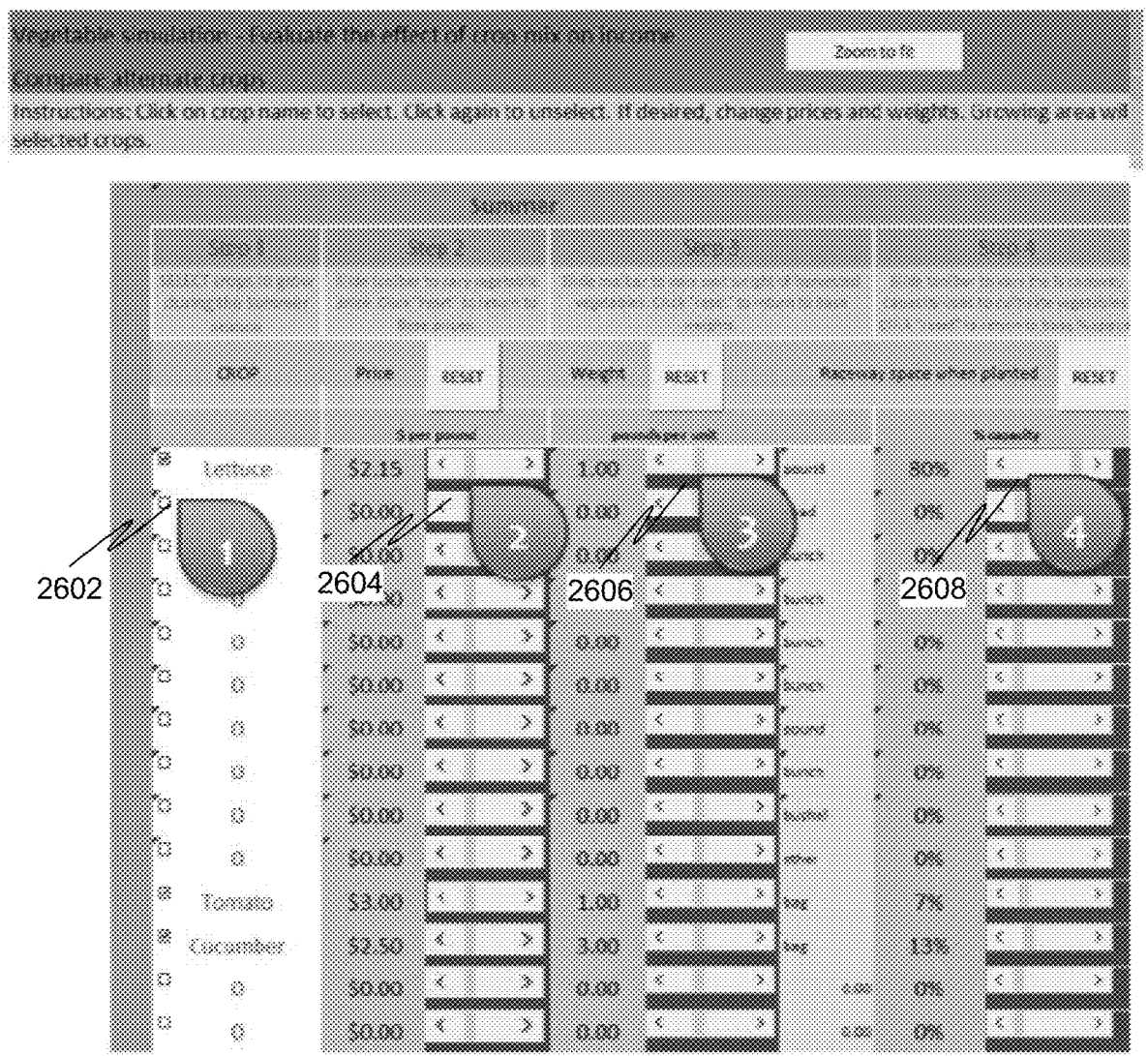
FIG. 26 shows an exemplary vegetable simulation worksheet of the software application, in accordance with an embodiment.
Figure 27:
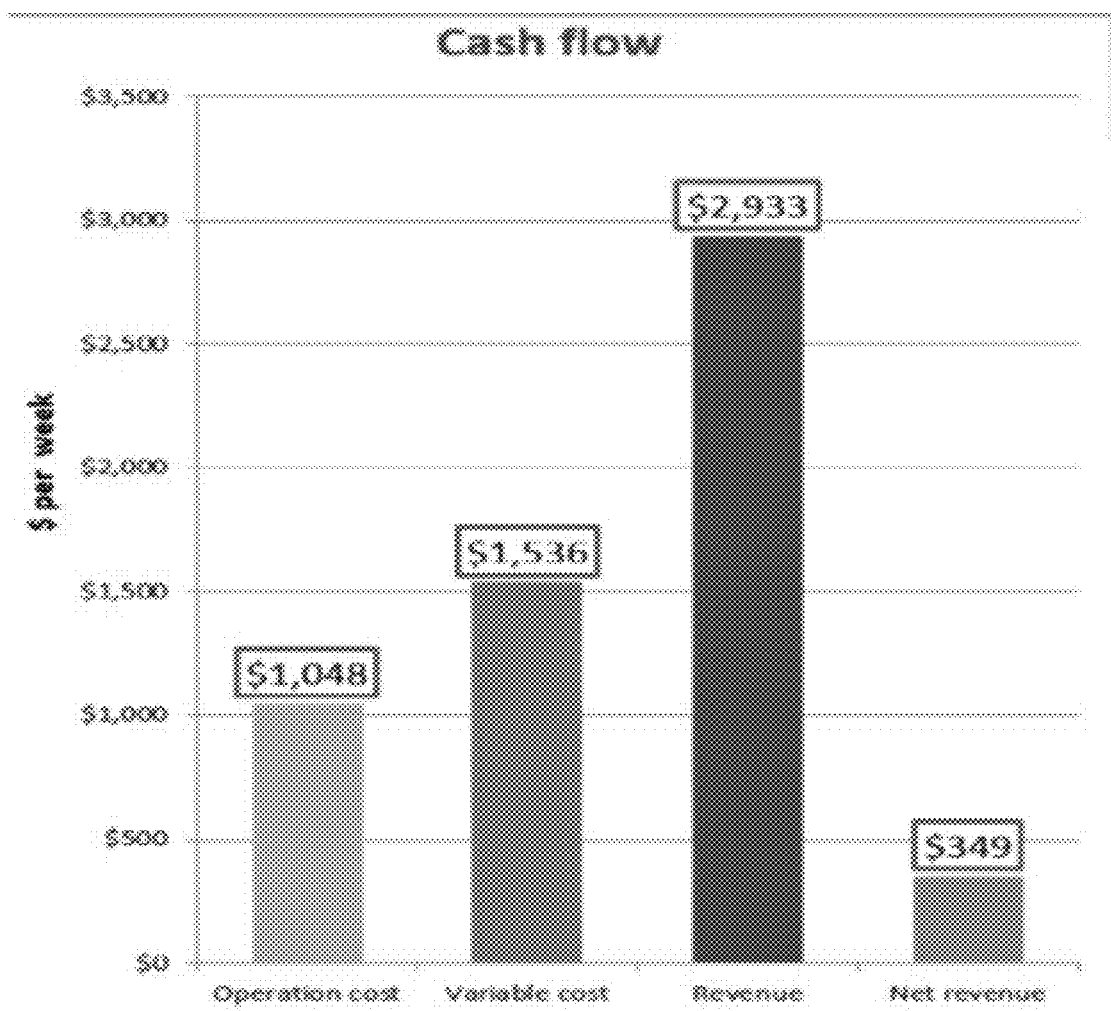
FIG. 27 shows a graphical representation of vegetable simulation, in accordance with an embodiment.

FIG. 26 shows an exemplary vegetable simulation worksheet 2600 of the software application related to simulation analysis and farming decisions, that may allow the user to evaluate effect of crop mix on income, in accordance with an embodiment. Accordingly, the simulation analysis may include using a vegetable crop simulation tool. The user selects one or more crops from a field 2602, adjust prices in a field 2604, adjust unit weights in a field 2606, adjust space allocation in a field 2608, and view graphical results, such as through a bar-graph 2700 as shown in FIG. 27. The crop simulation tool may display effect on income from changes in crop mix, sales price, and harvest yields.

Figure 28:
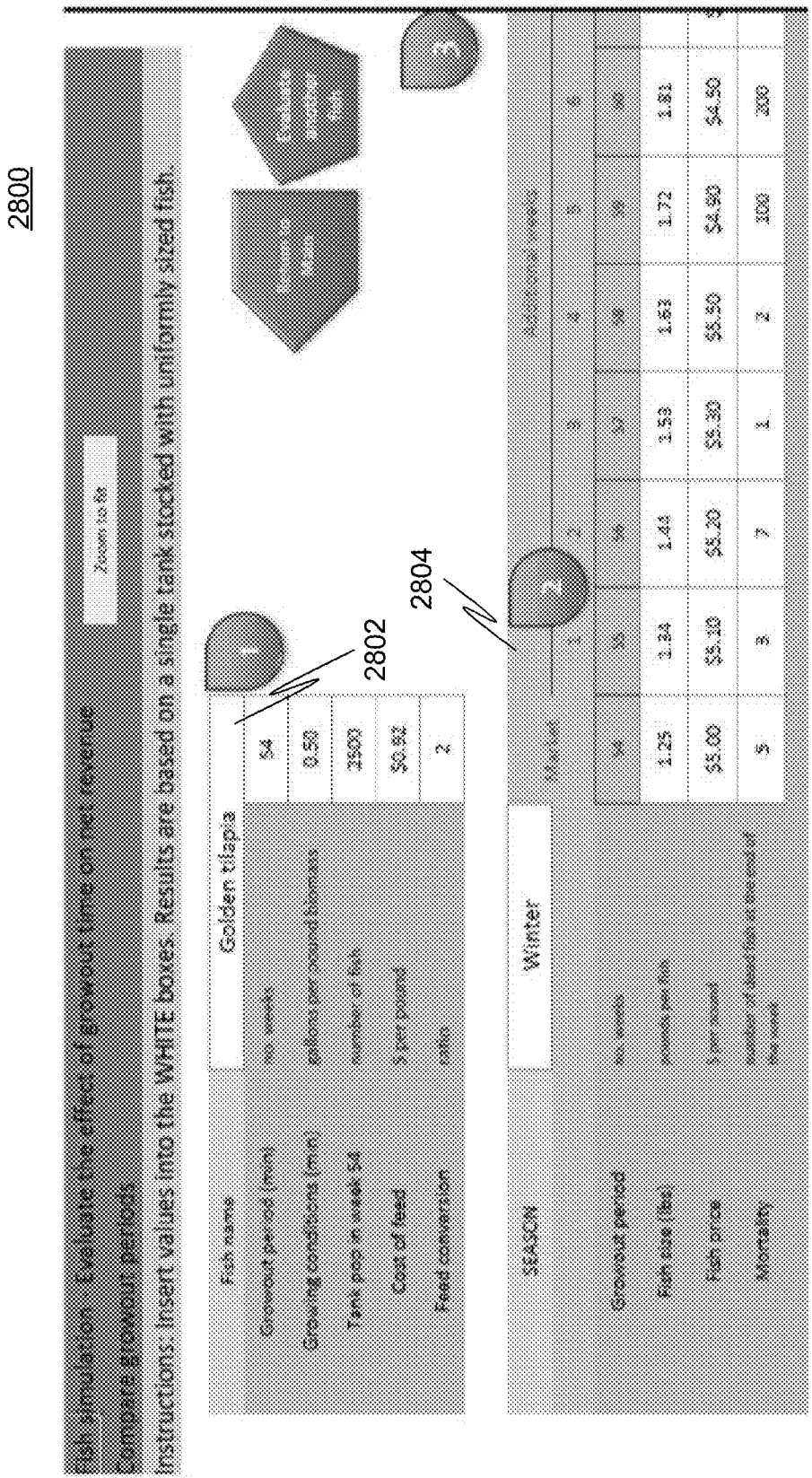
FIG. 28 shows an exemplary fish simulation worksheet of the software application, in accordance with an embodiment.
Figure 29:
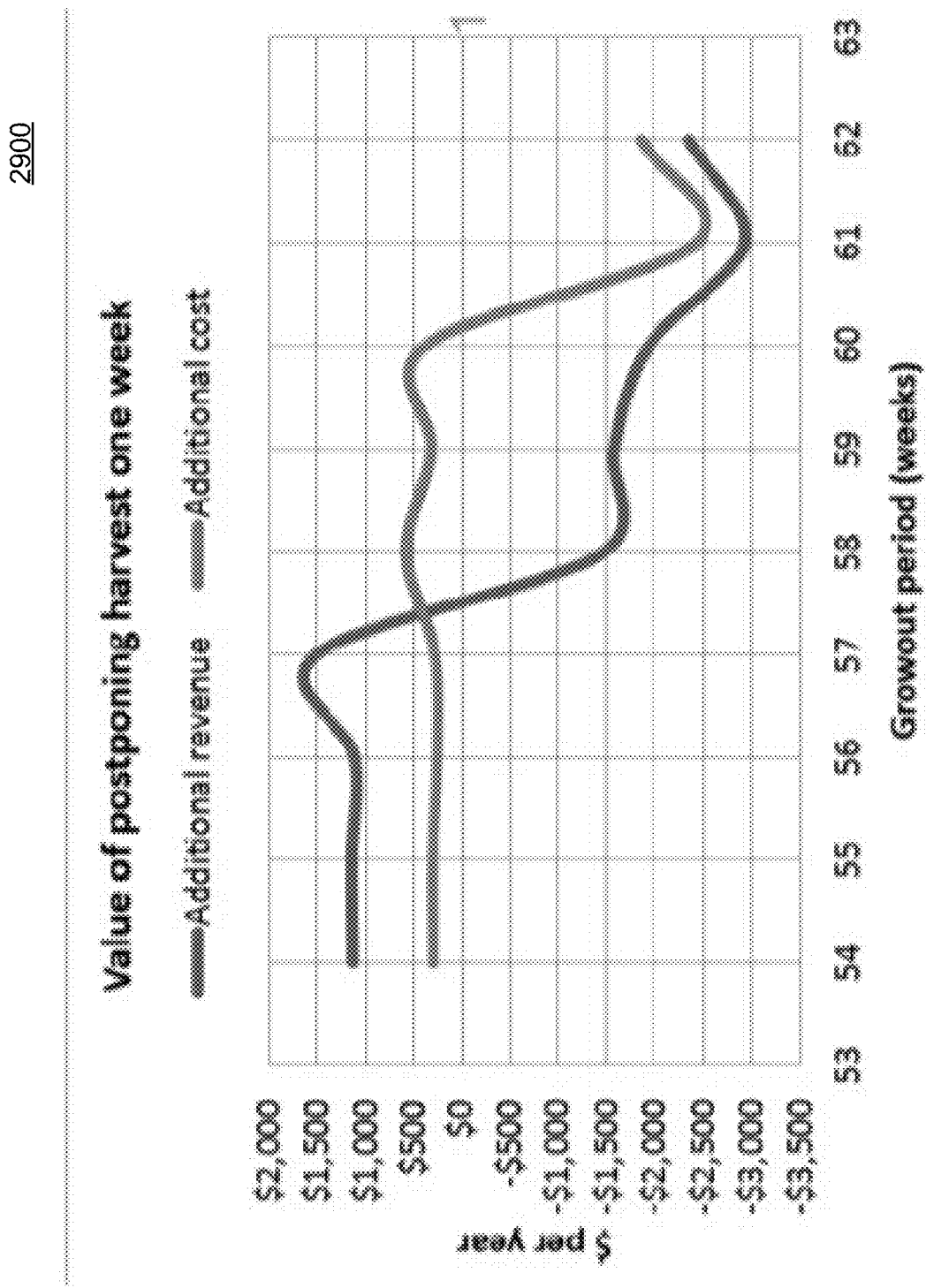
FIG. 29 shows a graphical representation of fish simulation, in accordance with an embodiment.

FIG. 28 shows an exemplary fish simulation worksheet 2800 of the software application related to simulation analysis and farming decisions that may allow the user to compare grow-out periods, in accordance with an embodiment. Accordingly, the simulation analysis may include using a fish grow-out simulation tool. The user may enter a fish name, current grow-out period (weeks), growing conditions (min gallons per pound required to grow fish), a number of fish in the tank, feed cost ($ per pound), and feed conversion ratio (pounds of feed per pound of fish) (in a field 2802. Further, the user may enter harvested fish size (pounds per fish), fish price ($ per pound), and fish mortality (number of dead fish) data for each week in a field 2804. The graphical results may be then displayed, such as a graph 2900 as shown in FIG. 29. Further, the grow-out simulation tool may compute the additional revenue and cost from extending (or contracting) the grow-out period.

Figure 30:
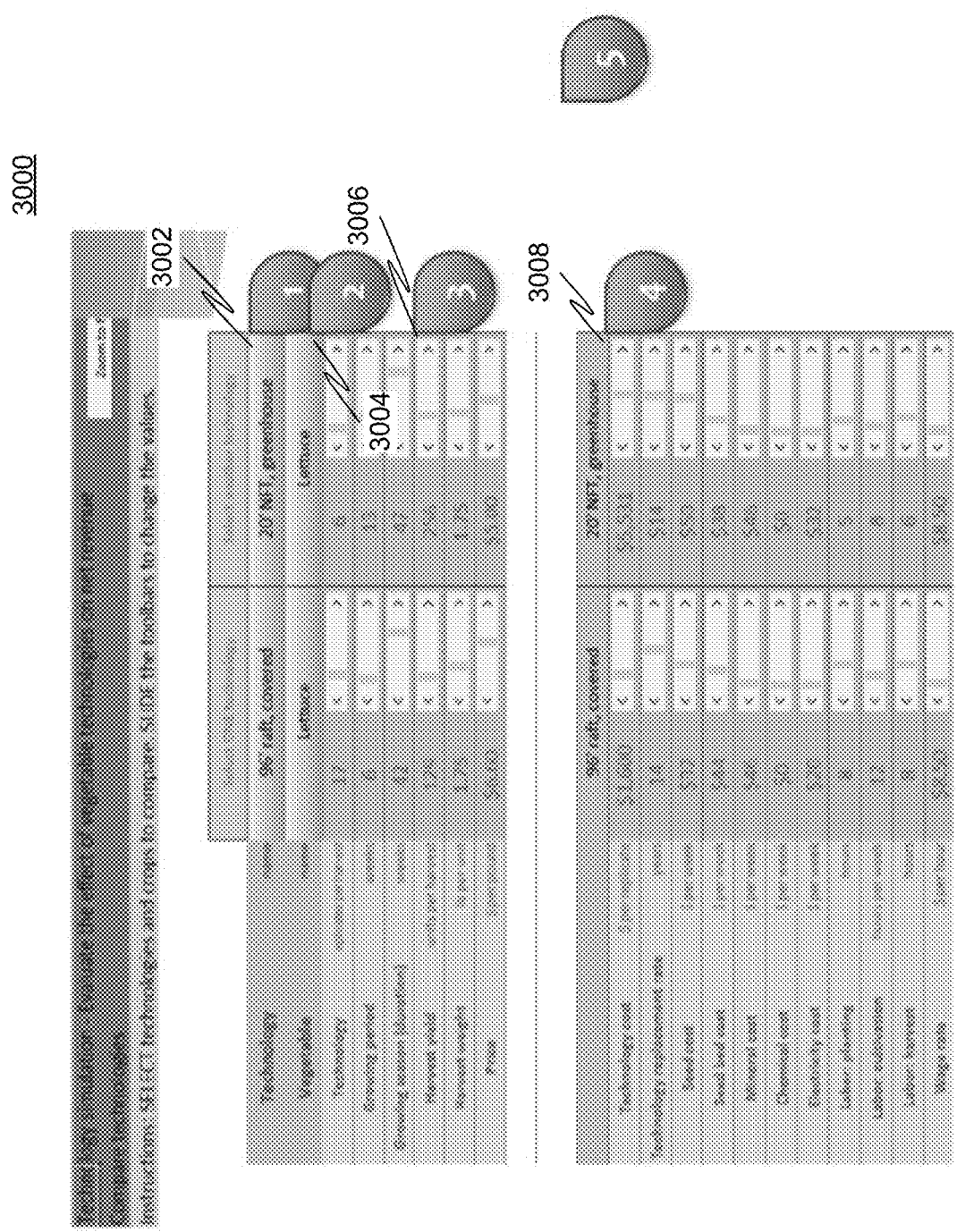
FIG. 30 shows an exemplary technology simulation worksheet of the software application, in accordance with an embodiment.
Figure 31:
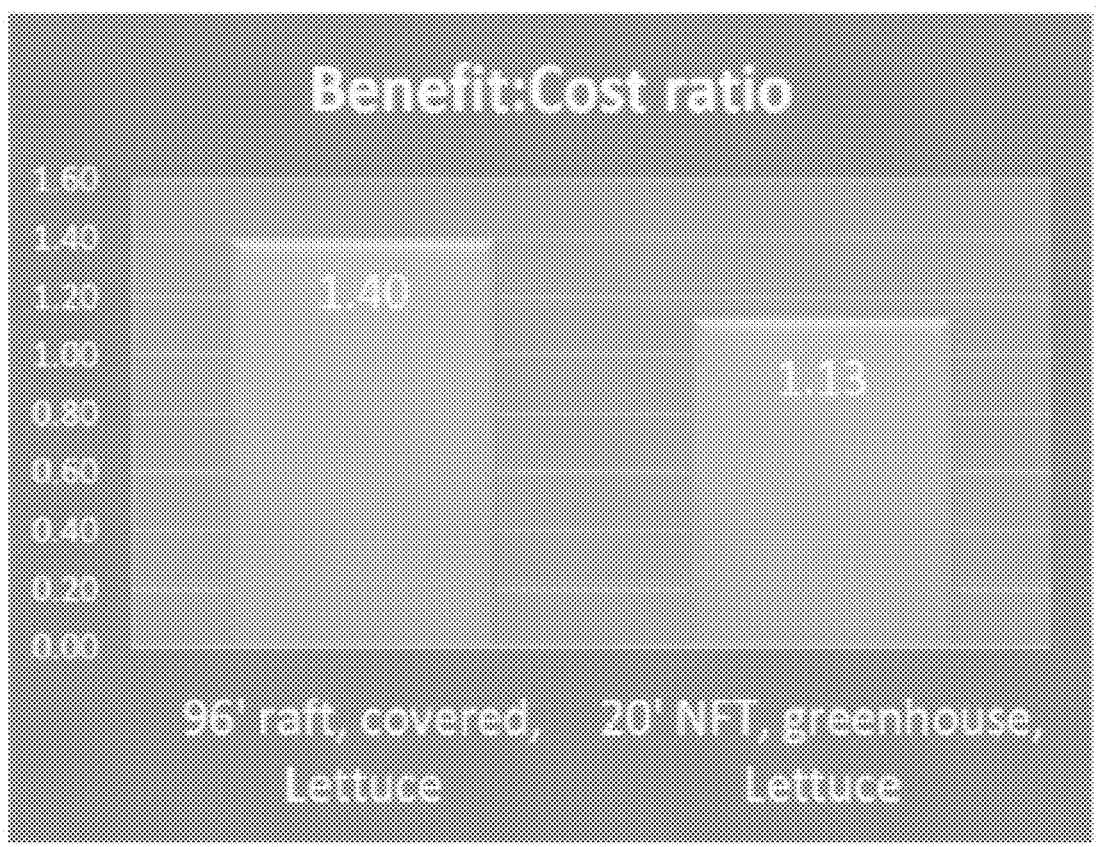
FIG. 31 shows a graphical representation of technology simulation, in accordance with an embodiment.

FIG. 30 shows an exemplary technology simulation worksheet 3000 of the software application related to simulation analysis and farming decisions that may allow the user to compare technologies, in accordance with an embodiment. Accordingly, the simulation analysis may include using a technology simulation tool. The user may make use of a dropdown menu 3002 to select two technologies, make use of a dropdown menu 3004 to select two crops, click arrow icons 3006 to adjust market and technology information and click arrow icons 3008 to adjust cost and input information. The graphical results may be then displayed in a bar-graph 3100 as shown in FIG. 31. The technology simulation tool may compare benefits and costs of alternate growing technologies for different crops.

Figure 32:
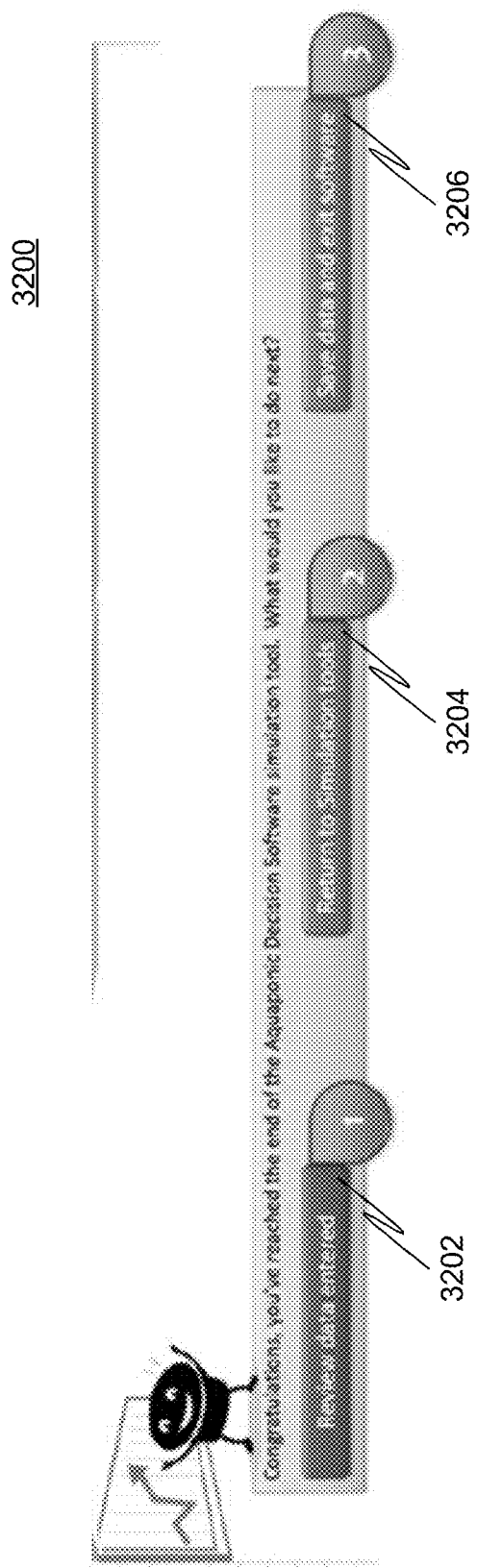
FIG. 32 shows an end screen of the software application, in accordance with an embodiment.

FIG. 32 displays an end screen indicating that the user may have reached the end of the process, in accordance with an embodiment. The user can review data using button 3202, conduct more simulations using button 3204, or save the information for use at a later time using button 3206.

Figure 33:
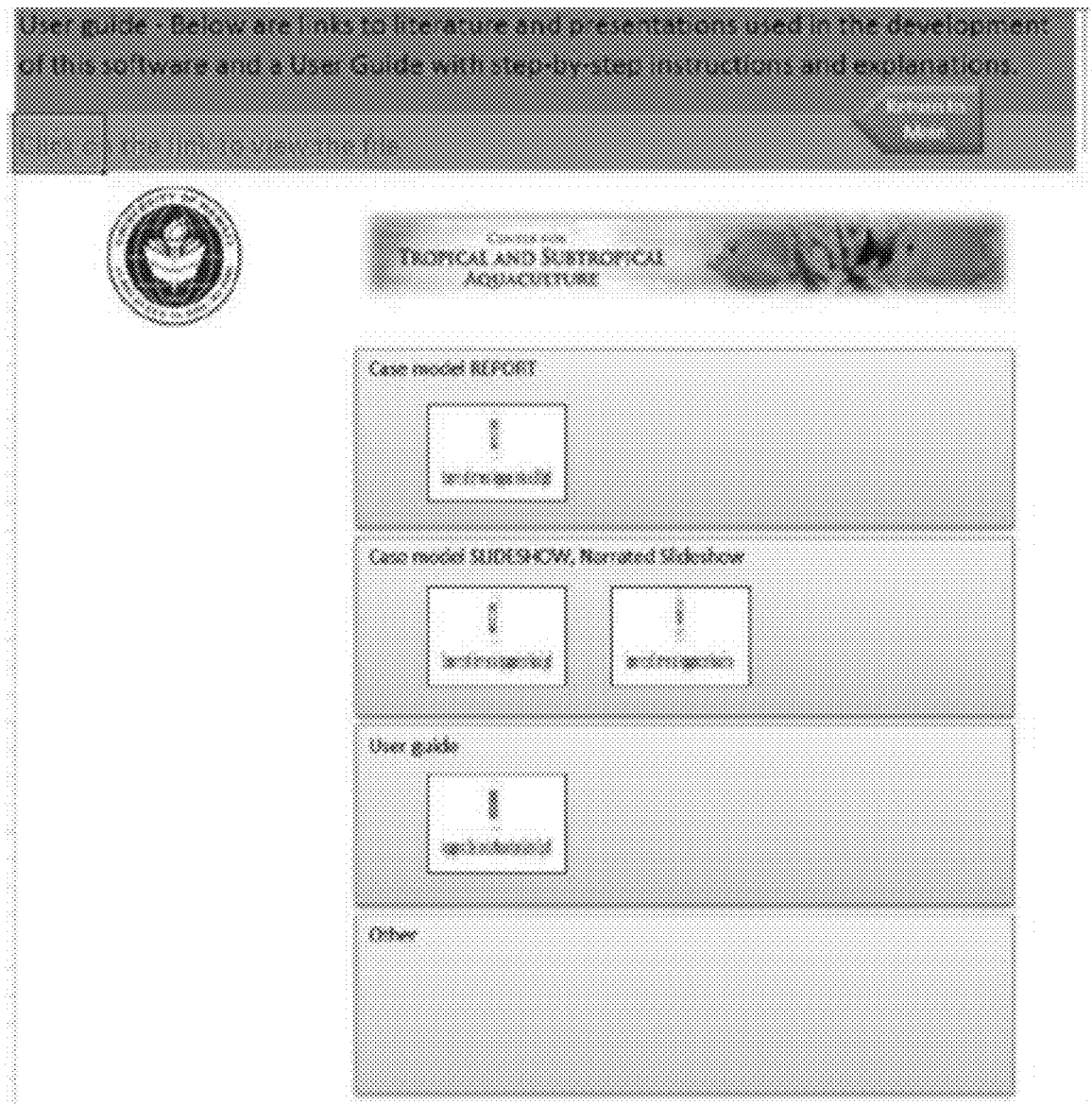
FIG. 33 shows an exemplary user guide of the software application, in accordance with an embodiment.

FIG. 33 shows an exemplary user guide 3300 of the software application, in accordance with an embodiment.

It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art.

Figure 34:
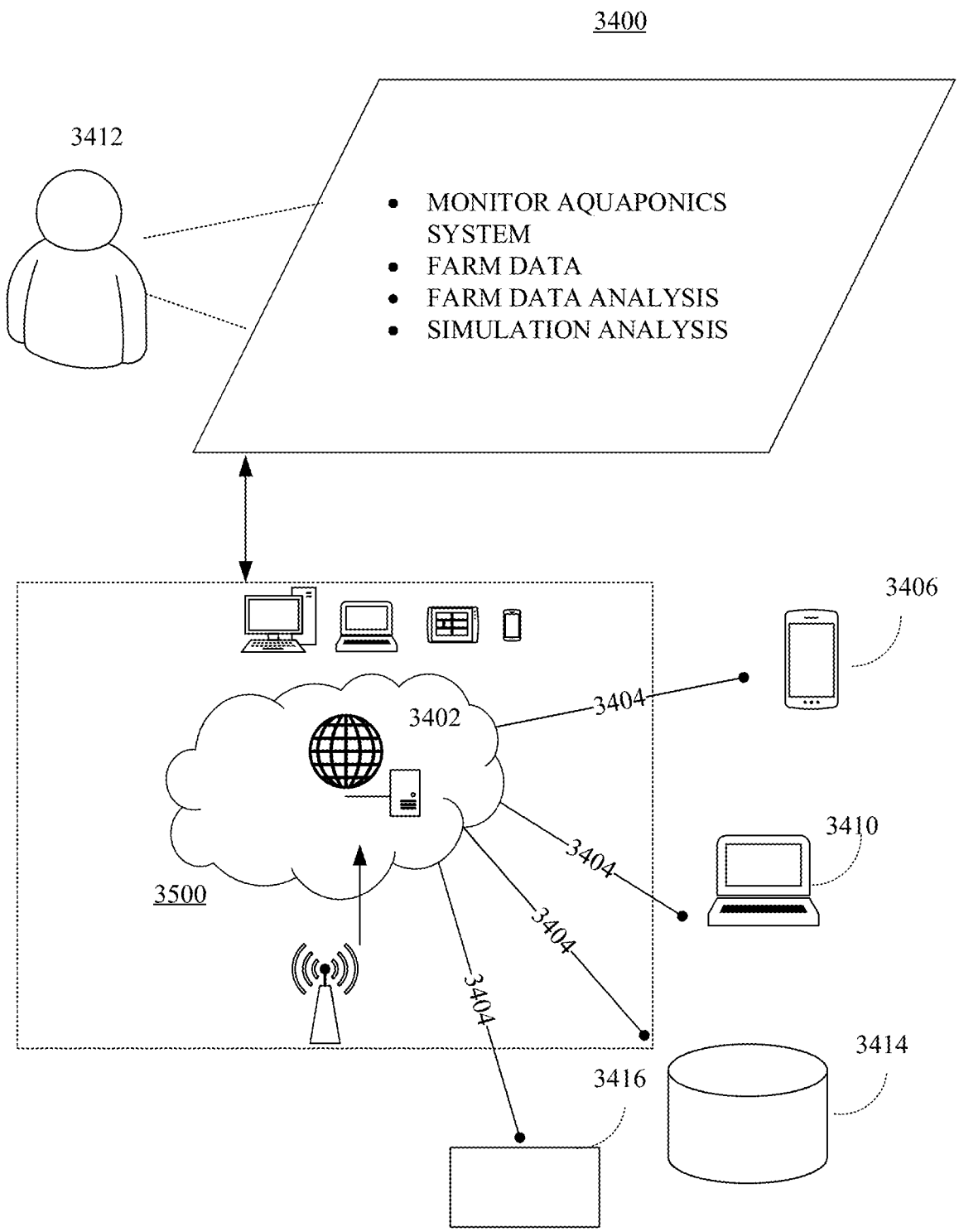
FIG. 34 is an illustration of a platform consistent with various embodiments of the present disclosure.

FIG. 34 is an illustration of a platform consistent with various embodiments of the present disclosure. By way of non-limiting example, the online platform 3400 for facilitating operation of one or more automated aquaponics systems may be hosted on a centralized server 3402, such as, for example, a cloud computing service. The centralized server 3402 may communicate with other network entities, such as, for example, a mobile device 3406 (such as a smartphone, a laptop, a tablet computer etc.), other electronic devices 3410 (such as desktop computers, server computers etc.), databases 3414 (e.g. other online platforms providing one or more data series, such as weather databases), and one or more automated aquaponics systems 3416 over a communication network 3404, such as, but not limited to, the Internet. Further, users of the platform may include relevant parties such as one or more of farmers, researchers, academicians, etc. Accordingly, electronic devices operated by the one or more relevant parties may be in communication with the platform 3400. For example, the mobile device 3406 may be operated by a farmer, who may provide a data set for analysis, and receive output to improve production, or income on a farm.

A user 3412, such as the one or more relevant parties, may access platform 3400 through a web-based software application or browser. The web-based software application may be embodied as, for example, but not be limited to, a website, a web application, a desktop application, and a mobile application compatible with a computing device 3500.

Figure 35:
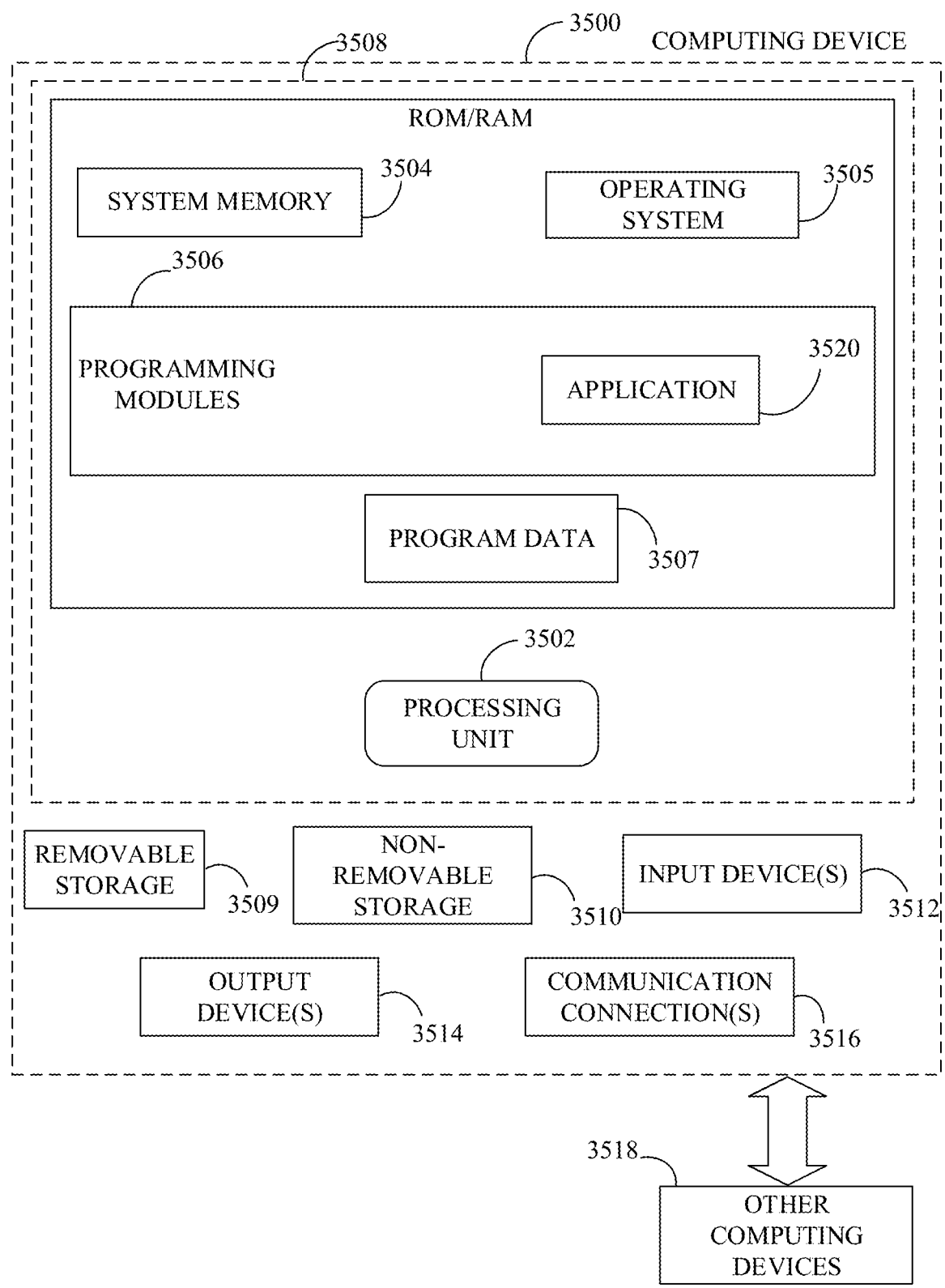
FIG. 35 is a block diagram of a computing device for implementing the methods disclosed herein, in accordance with an embodiment.

FIG. 35 is a block diagram of a computing device for implementing the methods disclosed herein, in accordance with an embodiment. Consistent with an embodiment of the disclosure, the aforementioned storage device and processing device may be implemented in a computing device, such as computing device 3500 of FIG. 35. Any suitable combination of hardware, software, or firmware may be used to implement the memory storage and processing unit. For example, the storage device and the processing device may be implemented with computing device 3500 or any of other computing devices 3518, in combination with computing device 3500. The aforementioned system, device, and processors are examples and other systems, devices, and processors may comprise the aforementioned storage device and processing device, consistent with embodiments of the disclosure.

With reference to FIG. 35, a system consistent with an embodiment of the disclosure may include a computing device or cloud service, such as computing device 3500. In a basic configuration, computing device 3500 may include at least one processing unit 3502 and a system memory 3504. Depending on the configuration and type of computing device, system memory 3504 may comprise, but is not limited to, volatile (e.g. random access memory (RAM)), non-volatile (e.g. read-only memory (ROM)), flash memory, or any combination. System memory 3504 may include operating system 3505, one or more programming modules 3506, and may include a program data 3507. Operating system 3505, for example, may be suitable for controlling computing device 3500's operation. Furthermore, embodiments of the disclosure may be practiced in conjunction with a graphics library, other operating systems, or any other application program and is not limited to any particular application or system. This basic configuration is illustrated in FIG. 35 by those components within a dashed line 3508.

Computing device 3500 may have additional features or functionality. For example, computing device 3500 may also include additional data storage devices (removable and/or non-removable) such as, for example, magnetic disks, optical disks, or tape. Such additional storage is illustrated in FIG. 35 by a removable storage 3509 and a non-removable storage 3510. Computer storage media may include volatile and nonvolatile, removable and non-removable media implemented in any method or technology for storage of information, such as computer-readable instructions, data structures, program modules, or other data. System memory 3504, removable storage 3509, and non-removable storage 3510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3500. Any such computer storage media may be part of device 3500. Computing device 3500 may also have input device(s) 3512 such as a keyboard, a mouse, a pen, a sound input device, a touch input device, etc. Output device(s) 3514 such as a display, speakers, a printer, etc. may also be included. The aforementioned devices are examples and others may be used.

Computing device 3500 may also contain a communication connection 3516 that may allow device 3500 to communicate with other computing devices 3518, such as over a network in a distributed computing environment, for example, an intranet or the Internet.

Communication connection 3516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3504, including operating system 3505. While executing on processing unit 3502, programming modules 3506 (e.g., application 3520) may perform processes including algorithms, methods, systems, applications, servers, databases as described above. The aforementioned process is an example, and processing unit 3502 may perform other processes. Other programming modules that may be used in accordance with embodiments of the present disclosure may include data processing applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

DETAILED DESCRIPTION OF EMBODIMENTS

An automated aquaponics apparatus is disclosed. The automated aquaponics apparatus may include at least one fish holding tank (such as the fish tank 102) configured to contain water. Further, the automated aquaponics apparatus may include at least one hydroponic unit. Further, the at least one fish holding tank may be functionally connected with the at least one hydroponic unit such that water from the at least one fish holding tank can be supplied to the at least one hydroponic unit and water from the at least one hydroponic unit can be supplied to the at least one fish holding tank. Further, the automated aquaponics apparatus may include a bio-digester (such as the digester 104) functionally connected with the at least one fish holding tank. Further, the automated aquaponics apparatus may include an atmospheric water generator functionally connected with one or more of the at least one fish holding tank and the at least one hydroponic unit. Further, the automated aquaponics apparatus may include desalination reverse osmosis system functionally connected with one or more of the at least one fish holding tank and the at least one hydroponic unit. Further, the automated aquaponics apparatus may include an energy production system configured to generate energy for powering the automated aquaponics apparatus. Further, the automated aquaponics apparatus may include at least one sensor configured to sense at least one variable associated with the automated aquaponics apparatus. Further, the automated aquaponics apparatus may include a control unit (such as the control unit 114) configured to control an operational state of one or more of the at least one fish holding tank, the at least one hydroponic unit, the bio-digester, the desalination reverse osmosis system and the energy production system.

In some embodiments, the at least one fish holding tank may be configured to may contain aquatic animals. Further, the at least one fish holding tank may also include an automatic feeding unit configured to automatically release food for the aquatic animals in the at least one fish holding tank. For example, aquatic animals may include fresh water lobster, fresh water shrimp, and fresh water salmon.

In some embodiments, the at least one hydroponic unit may include one or more of a Dutch bucket (such as the Dutch buckets 106), a Nutrient Film Technique (NFT) channel system, and a flow bed.

In some embodiments, the at least one hydroponic unit may be configured to may contain plants (such as the plants 132). For example, the plants may include food crops, microgreens, fruits, and vegetables. Further, fodder may be used to grow both barley for livestock consumption.

Accordingly, the water may be sent to Dutch buckets, where the water is cleaned by the plants in a grow medium in the Dutch buckets. The clean water may be then recirculated to the at least one fish holding tank. Further, in NFT systems, nutrient-rich water may be pumped down small enclosed gutters. The water flowing down the gutter is only a very thin film. Further, the plants may sit in small plastic cups allowing their roots to access the water and absorb the nutrients. Yet further, the flow beds may be used to propagate the seeds and transfer to float rafts. Then, the water may be recirculated after it has been through the flow beds.

Further, the automated aquaponics apparatus may be designed to produce year-round food stock with no limits on variety.

In some embodiments, the automated aquaponics apparatus may further include at least one pipe to functionally connect two or more components selected from a group including the at least one fish holding tank, the at least one hydroponic unit, the bio-digester, the atmospheric water generator and the desalination reverse osmosis system. For example, the one or more fluids may include nutrient-rich water coming out of the at least one fish holding tank, clean water coming out of the at least one hydroponic unit, slurry from the bio-digester, clear water from the atmospheric water generator and potable water from the desalination reverse osmosis system In some embodiments, the automated aquaponics apparatus may further include a pump (such as the pump 108) to circulate one or more fluids in the at least one pipe.

In some embodiments, the bio-digester may be functionally connected with the at least one fish holding tank via a bio-filter (such as the filter 110) to filter out solid waste. Further, the solid waste may be sent to the bio-digester. In further embodiments, the bio-digester may be configured to produce one or more of syngas and biogas from the solid waste.

In some embodiments, the energy production system may include one or more of a photovoltaic energy production system, a wind energy production system and a hydroelectric energy production system. The photovoltaic energy production system may include one or more solar panels (such as the solar panels 126) to convert solar power into electrical energy. The wind energy production system may include one or more wind turbines to convert kinetic energy of the flow of air into electrical energy. The hydroelectric energy production system may include one or more hydroelectric turbines integrated into at least one pipe to convert kinetic energy of the flow of fluids (in the at least one pipe) into electrical energy. Further, biogas produced by the bio-digester may be burned to produce electrical energy. Further, the electrical energy produced by the energy production system may be stored in a battery.

In some embodiments, the atmospheric water generator may be configured to extract water from the humid ambient air. Further, the atmospheric water generator may be configured to maintain a water level necessary for operations of the automated aquaponics apparatus.

In some embodiments, the desalination reverse osmosis system may be configured to produce potable water for human and livestock consumption. For example, the desalination reverse osmosis system may process clean water coming out of the at least one hydroponic unit to produce potable water.

In some embodiments, the at least one sensor may include one or more of a humidity sensor, a temperature sensor, and a pH sensor (such as the humidity sensor 116, the temperature sensor 118, and the pH sensor 120 respectively).

In some embodiments, the control unit may be configured to control the at least one operational parameter based on the at least one variable. Further, the control unit may be connected to the at least one sensor. The control unit may be connected to the at least one sensor via wired or wireless communication channels, such as, but not limited to, Wi-Fi, Bluetooth, ZigBee. Further, the control unit may obtain one or more measurements corresponding to the at least one operational parameter from the at least one sensor. For example, the at least one operational parameter may include one or more of temperature (air, nutrient solution, root-zone), humidity (% RH), carbon dioxide (CO2), light (intensity, spectrum, interval), nutrient concentration (PPM, EC) and nutrient pH (acidity).

In further embodiments, the control unit may be configured to optimize the use of resources such as water, energy, space, capital, and labor.

In some embodiments, the control unit may be connected to one or more actuating units associated with one or more of the at least one fish holding tank, the at least one hydroponic unit, the bio-digester, the desalination reverse osmosis system and the energy production system. Further, the control unit may be connected to the one or more actuating units via wired or wireless communication channels, such as, but not limited to, Wi-Fi, Bluetooth, ZigBee.

In some embodiments, the one or more actuating units may include automated vents for CO2 control and air infiltration (such as the automated vents 122), a water curtain for cooling ambient air, a water filter to add air to the water, a heating unit, a water pump to circulate one or more fluids, one or more LED grow lights (such as the LED grow lights 124), and one or more fluid filters. Further, the automated vents may be placed on one or more walls or a ceiling of a housing of the automated aquaponics apparatus. Further, the heating unit may produce heat by burning biogas produced by the bio-digester. Further, the one or more LED grow lights may emit light appropriate for photosynthesis to stimulate plant growth. Further, the one or more fluid filters may be configured to filter out solid waste and excess nutrients from fluids flowing through the one or more fluid filters. The one or more fluid filters may be fitted within the at least one pipe of the automated aquaponics system. Further, the one or more actuating units may be powered using the electrical energy produced by the energy production system.

In further embodiments, the aquaponics system may also include a monitored and an automated nutrient delivery system.

In some embodiments, the automated aquaponics apparatus may further include an Integrated Pest Management (IPM) system to combat loss and disease. Further, the IPM system may be configured to detect pests and use remedial measures to kill pests. For example, the IPM may automatically spray necessary pesticides to kill the detected pests. Further, the IPM system may detect pests using image processing techniques on the images of the plants grown in the at least one hydroponic system.

In some embodiments, the automated aquaponics apparatus may further include at least one camera (such as the camera 140) to capture visual images associated with one or more of the at least one fish holding tank, the at least one hydroponic unit, the bio-digester, the desalination reverse osmosis system and the energy production system. This may allow the user to remotely visually monitor the automated aquaponics apparatus.

In some embodiments, the automated aquaponics apparatus may further include a communication unit configured to receive control commands from a remote user device. Further, the communication unit may be coupled to the control unit. Further, the remote user device may be configured to execute a software application configured to enable a user to control the automated aquaponics apparatus. Further, the communication unit may be configured to send measurement data received from the at least one sensor to a cloud server for storage.

In some embodiments, the software application provides information related to one or more of a rate of return on investment, one or more vegetable crops to grow, vegetable technology to use, and one or more fish species to grow. Further, the software application may be configured to compute and provide upfront costs, operations costs, sales revenue, after-tax profit, and rate of return on a new or upgraded automated aquaponics apparatus. The software application may be configured to apply one or more economic and business principles to analyze data provided by users and displays result in a format to help the users make informed farm decisions.

In some embodiments, the automated aquaponics apparatus may further include a housing configured to enclose each of the at least one fish holding tank, the at least one hydroponic unit, the bio-digester, the desalination reverse osmosis system, the energy production system, the at least one sensor and the control unit. The automated aquaponics apparatus may be scalable. Accordingly, the housing may include one or more of a building (such as an old unused building), a warehouse, a greenhouse, a shipping container and a closet.

What is claimed is:

1. An automated aquaponics apparatus comprising:
   at least one fish holding tank configured to contain water;
   at least one hydroponic unit configured to contain plants, the at least one hydroponic unit comprising a Dutch bucket, a Nutrient Film Technique (NFT) channel system, and a flow bed;
   wherein the at least one fish holding tank is functionally connected with the at least one hydroponic unit such that water from the at least one fish holding tank can be supplied to the at least one hydroponic unit and water from the at least one hydroponic unit can be supplied to the at least one fish holding tank;
   a bio-digester functionally connected with the at least one fish holding tank;
   an atmospheric water generator functionally connected with at least one of the at least one fish holding tank and the at least one hydroponic unit;
   desalination reverse osmosis system functionally connected with at least one of the at least one fish holding tank and the at least one hydroponic unit;
   an energy production system configured to generate energy for powering the automated aquaponics apparatus;
   at least one sensor configured to sense at least one variable associated with the automated aquaponics apparatus;
   a control unit configured to control an operational state of at least one of the at least one fish holding tank, the at least one hydroponic unit, the bio-digester, the desalination reverse osmosis system and the energy production system;
   a plurality of actuating units;
   the plurality of actuating units associated with the at least one fish holding tank, the at least one hydroponic unit, the bio-digester, the desalination reverse osmosis system and the energy production system;
   the control unit connected to the plurality of actuating units;
   the plurality of actuating units comprising automated vents for CO2 control and air infiltration, a water curtain for cooling ambient air, a water filter to add air to the water, one or more LED grow lights, and one or more fluid filters; and
   an Integrated Pest Management (IPM) system to combat loss and disease;
   the IPM system configured to automatically spray pesticides to kill detected pests.

2. The automated aquaponics apparatus of claim 1, wherein the at least one fish holding tank is configured to contain aquatic animals.

3. The automated aquaponics apparatus of claim 1 further comprising at least one pipe to functionally connect two or more components selected from a group comprising the at least one fish holding tank, the at least one hydroponic unit, the bio-digester, the atmospheric water generator and the desalination reverse osmosis system.

4. The automated aquaponics apparatus of claim 3 further comprising a pump to circulate one or more fluids in the at least one pipe.

5. The automated aquaponics apparatus of claim 1, wherein the bio-digester is functionally connected with the at least one fish holding tank via a bio-filter to filter out solid waste, wherein the solid waste is sent to the bio-digester.

6. The automated aquaponics apparatus of claim 5, wherein the bio-digester is configured to produce one or more of syngas and biogas from the solid waste.

7. The automated aquaponics apparatus of claim 1, wherein the energy production system includes one or more of a photovoltaic energy production system, a wind energy production system and a hydroelectric energy production system.

8. The automated aquaponics apparatus of claim 1, wherein the atmospheric water generator is configured to extract water from humid ambient air.

9. The automated aquaponics apparatus of claim 1, wherein the desalination reverse osmosis system is configured to produce potable water for human and livestock consumption.

10. The automated aquaponics apparatus of claim 1, wherein the at least one sensor includes one or more of a humidity sensor, a temperature sensor, and a pH sensor.

11. The automated aquaponics apparatus of claim 1, wherein the control unit is configured to control the at least one operational parameter based on the at least one variable, wherein the control unit is connected to the at least one sensor.

12. The automated aquaponics apparatus of claim 1, wherein the plurality of actuating units further comprise a heating unit and a water pump to circulate one or more fluids.

13. The automated aquaponics apparatus of claim 1 further comprising at least one camera to capture visual images associated with at least one of the at least one fish holding tank, the at least one hydroponic unit, the bio-digester, the desalination reverse osmosis system and the energy production system.

14. The automated aquaponics apparatus of claim 1 further comprising a communication unit configured to receive control commands from a remote user device, wherein the communication unit is coupled to the control unit, wherein the remote user device is configured to execute a software application configured to enable a user to control the automated aquaponics apparatus.

15. The automated aquaponics apparatus of claim 14, wherein the software application provides information related to one or more of a rate of return on investment, one or more vegetable crops to grow, vegetable technology to use, and one or more fish species to grow.

16. The automated aquaponics apparatus of claim 1 further comprising a housing configured to enclose each of the at least one fish holding tank, the at least one hydroponic unit, the bio-digester, the desalination reverse osmosis system, the energy production system, the at least one sensor and the control unit.

* * * * *